(12) United States Patent
Tanihara et al.

(10) Patent No.: US 8,890,554 B2
(45) Date of Patent: Nov. 18, 2014

(54) CURRENT CONTROL DEVICE FOR ELECTRIC LOAD

(75) Inventors: Hiroaki Tanihara, Chiyoda-ku (JP);
Shuichi Matsumoto, Chiyoda-ku (JP);
Masao Motonobu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1095 days.

(21) Appl. No.: 12/886,072

(22) Filed: Sep. 20, 2010

(65) Prior Publication Data

US 2011/0234189 A1    Sep. 29, 2011

(30) Foreign Application Priority Data

Mar. 25, 2010 (JP) ................................. 2010-069845

(51) Int. Cl.
*G01R 31/00* (2006.01)
(52) U.S. Cl.
USPC ............. 324/750.01; 324/750.02; 324/750.03
(58) Field of Classification Search
CPC ..................... H02M 3/156; H02M 2001/0025; H02J 1/04
USPC ...................................................... 324/750.01
See application file for complete search history.

(56) References Cited

U.S. PATENT DOCUMENTS

| | | | |
|---|---|---|---|
| 4,705,937 A * | 11/1987 | Marek | 219/497 |
| 5,645,352 A | 7/1997 | Menten | |
| 8,624,542 B2 * | 1/2014 | Gadda | 318/727 |
| 2005/0104601 A1 | 5/2005 | Engelmann et al. | |
| 2006/0197508 A1 | 9/2006 | Matsumoto et al. | |
| 2007/0080905 A1 * | 4/2007 | Takahara | 345/76 |
| 2014/0135948 A1 * | 5/2014 | Kanzaki et al. | 700/54 |

FOREIGN PATENT DOCUMENTS

| | | |
|---|---|---|
| DE | 10 2005 040 060 B4 | 8/2007 |
| EP | 0 636 869 A1 | 2/1995 |
| JP | 2005-033965 A | 2/2005 |
| JP | 2006-100509 A | 4/2006 |
| JP | 2006-238668 A | 9/2006 |
| WO | 03/074338 A1 | 9/2003 |

OTHER PUBLICATIONS

German Office Action, issued Feb. 7, 2014, Patent Application No. 10-2010-050306.1.

* cited by examiner

*Primary Examiner* — Thomas F Valone
(74) *Attorney, Agent, or Firm* — Sughrue Mion, PLLC

(57) ABSTRACT

Initial calibration is performed only under normal-temperature environment, and accurate current control is performed under practical use temperature environment. A temperature sensor 171 is arranged close to a current detection resistor 126 having predetermined temperature characteristics. Resistance values are estimated in a calibration environment and a practical use environment, an actually measured load current in the calibration environment corresponding to a target load current is stored as control characteristic data, a corrected target current corresponding to the target load current is calculated, and a converted target current based on a change ratio of current detection resistance is controlled as a target current for current control. A resistance change amount by heat generation of the current detection resistor 126 which cannot be entirely detected by the temperature sensor 171 is corrected in control characteristic data, such that linearity of control characteristics is improved.

19 Claims, 10 Drawing Sheets

- 701A — START PWM CONTROL
- 702A — GENERATE TARGET LOAD CURRENT Is0 AND TARGET SIGNAL VOLTAGE Es0
- 703A — CONVERT AND CALCULATE CORRECTED TARGET CURRENT Is AND CORRECTED SIGNAL VOLTAGE Es (FIG. 8)
- 704A — CALCULATE CONVERTED SIGNAL VOLTAGE Esb
- 705A — CALCULATE DEVIATION Esb−Ef AND GENERATE NEGATIVE FEEDBACK CONTROL SIGNAL
- 706A — GENERATE FEEDBACK CONTROL OUTPUT PWMA
- 707A — END PWM CONTROL
- 710A

US 8,890,554 B2

CURRENT CONTROL DEVICE FOR ELECTRIC LOAD

BACKGROUND OF THE INVENTION

1. Field of the Invention

The present invention relates to a current control device for an inductive electric load which is used in, for example, an on-vehicle electronic control apparatus, and in particular, to a current control device for an electric load which is negative-feedback controlled by a target load current and a detected load current for improved current control accuracy.

2. Description of the Related Art

Various types of current control devices for electric loads are known, which control an on/off duty factor of a switching element connected between a drive power supply and an electric load such that a target load current coincides with a current detected by a current detection resistor. For example, such control devices include current control devices for linear solenoids which require a current constantly varying in a wide range, and current control devices for fuel injection electromagnetic valves which are kept open by a constant low current after being opened rapidly.

As one example of the current control devices, an internal feedback control type is known in which a microprocessor generates a target load current and a switching drive command in accordance with a deviation between a target load current and a detected load current (see JP2006-238668A (FIG. 1 and Abstract)). As another example of the current control devices, an external feedback control type is known in which a microprocessor only generates a target load current, and a switching drive command is generated by a deviation integration circuit provided outside the microprocessor in accordance with a deviation between a target load current and a detected load current (see JP2006-100509A (FIG. 1 and Abstract)).

The current control device for an electric load described in JP2006-238668A or JP2006-100509A includes a current detection resistor which is connected in series between a switching, element and an electric load, and an amplifier circuit part which amplifies a voltage across the current detection resistor by a differential amplifier to obtain a monitored voltage proportional to a load current. JP2006-238668A or JP2006-100509A describes a device in which sequentially, obtains calibration constants in terms of the causes of error occurrence so as to suppress control errors in the current control circuit as a whole.

Meanwhile, a semiconductor power module described in JP2005-033965A (FIG. 4 and Abstract) uses a bonding wire as a current detection element to measure a main circuit current flowing in a power semiconductor element by a voltage drop in the bonding wire. The semiconductor power module is also provided with a temperature sensor in which detects the temperature of a predetermined portion of a case in which forms the appearance of the semiconductor power module. JP2005-033965A describes a device in which accurately carries out current detection by a temperature correction circuit, which has a data table representing the relationship between temperature and resistance value of the bonding wire, even when temperature changes.

SUMMARY OF INVENTION

(1) Description of Technical Problems in the Related Art

The current control device for an electric load described in JP2006-238668A or JP2006-100509A shows an accurate calibration unit which focuses on the causes of occurrence of control errors concentrating on an amplifier circuit for current detection. In this case, if the resistance value of the current detection resistor changes with change in environmental temperature, there is a problem in that a target control current cannot be obtained accurately.

Accordingly, if the resistance value of the current detection resistor fluctuates due to ambient temperature and self-heating, current control accuracy is deteriorated. For this reason, it is necessary to use an accurate current detection resistor in which has no change in a resistance value with respect to change in temperature. As a result, products become expensive.

Meanwhile, according to JP2005-033965A, the change in the resistance value of the bonding wire corresponding to a current detection resistor is estimated by a temperature sensor provided in a mold case. However, if a large current flows in the bonding wire corresponding to a current detection resistor, the temperature of the current detection resistor itself significantly rises and becomes higher than a temperature detected by the temperature sensor, such that it is impossible to accurately estimate the resistance value of the bonding wire corresponding to a current detection resistor. Accordingly, it is difficult to estimate an accurate detected load current.

(2) Description of Object of the Invention

A first object of the invention is to provide an internal feedback type or external feedback type current control device for an electric load capable of accurately estimating a detected load current with respect to fluctuations and various environmental temperature changes of components of an overall control circuit only by initial calibration in the normal temperature environment, accurately estimating a detected load current even when the resistance value of a current detection resistor changes due to self-heating, and the temperature of the current detection resistor itself differs from a temperature detected by a temperature sensor arranged adjacent to the current detection resistor, and suppressing degradation of current control accuracy.

A second object of the invention is to provide an inexpensive current control device for an electric load capable of carrying out accurate current control by using a current detection resistor which does not require accuracy comparatively, without using an accurate current detection resistor which has no change in a resistance value with respect to change in temperature.

An aspect of the invention provides a current control device for an electric load. The current control device for an electric load includes a power supply circuit part in which a switching element, a current detection resistor, and an electric load, to which power is supplied from a drive power supply, are connected in series to each other, and a control circuit part which controls an on/off ratio of the switching element on the basis of a target load current $Is0$ for the electric load and a load current $Im$ flowing in the current detection resistor. The control circuit part includes a microprocessor having a nonvolatile program memory, an RAM memory for arithmetic processing, and a multichannel AD converter, an amplifier circuit part for current detection, a temperature detection circuit, and a drive signal circuit. The nonvolatile program memory includes temperature characteristic data which is one of an approximation formula and a data table regarding temperature-to-resistance value of the current detection resistor. The amplifier circuit part for current detection amplifies a voltage across the current detection resistor, and generates a monitored voltage $Ef$ which is based mainly on a current proportional component proportional to the load current Im for the electric load and includes an error component. When the temperature close to the current detection resistor is a normal-temperature ambient temperature Ta, control characteristic data which represents the correspondence relationship between an actually measured load current Im measured by an external ammeter for calibration and the target load current Is0 is stored in one of a data storage area of the nonvolatile program memory and a nonvolatile data memory connected instead of the data storage area. The temperature detection circuit includes a temperature sensor and generates measured voltages Sa and Sb corresponding to the normal-temperature ambient temperature Ta of the current detection resistor and an actual operation ambient temperature Tb in operation, respectively, and the measured voltages Sa and Sb are input to the microprocessor through the multichannel AD converter. The control circuit part generates a corrected signal voltage Es proportional to a corrected target current Is obtained by correcting the target load current Is0, and controls the on/off ratio of the switching element such that either one selected from a first relationship in which the corrected signal voltage Es coincides with a converted monitored voltage Efb of the monitored voltage Ef, and a second relationship in which a converted signal voltage Esb proportional to a converted target current Isb coincides with the monitored voltage Ef is satisfied. The corrected target current Is corresponds to the target load current Is0 generated by the control circuit part when the actually measured load current Im corresponding to the target load current Is0 is replaced by the target load current Is0 in the control characteristic data. One of the converted monitored voltage Efb and the converted target current Isb is calculated on the basis of a comparison value of normal-temperature resistance Ra and actual operation resistance Rb of the current detection resistor obtained from the temperature characteristic data in response to the normal-temperature ambient temperature Ta when the control characteristic data is obtained and the actual operation ambient temperature Tb in operation.

As described above, the current control device for an electric load according to the aspect of the invention includes temperature characteristic data of the current detection resistor, the temperature detection circuit which measures the ambient temperature of the current detection resistor, and control characteristic data for calculating a corrected target current necessary to obtain a target load current. The corrected target current Is corresponding to the target load current Is0 which is required in operation is calculated, and conversion processing corresponding to the actual operation ambient temperature Tb is carried out for at least one of the corrected signal voltage Es proportional to the corrected target current Is and the monitored voltage Ef proportional to the load current Im. Then, switching control of the switching element for load current control is performed such that either one selected from a relationship in which the corrected signal voltage Es coincides with the converted monitored voltage Efb and a relationship in which the converted signal voltage Esb coincides with the monitored voltage Ef is satisfied.

Therefore, even when initial calibration is performed only under the normal-temperature environment, since control characteristic data and accurate temperature characteristics of the current detection resistor are stored in advance, fluctuations of components and an accurate detected load current under the actual operation high-temperature environment or actual operation low-temperature environment can be estimated. With regard to changes in the resistance value due to self-heating of the current detection resistor caused by the load current and an influence by the temperature difference between the temperature of the current detection resistor itself and the ambient temperature measured by the temperature detection circuit, the converted monitored voltage or the converted target current is calculated on the basis of comparison of normal-temperature resistance obtained at the time of acquisition of control characteristic data with actual operation resistance obtained in the actual operation state, such that an accurate detected load current can be estimated and current control errors can be suppressed.

Accurate current control can be performed by using a current detection resistor which does not require accuracy comparatively, without using an accurate current detection resistor which has no change in a resistance value with respect to change in temperature. As a result, products become inexpensive.

The foregoing and other objects, features, aspects, and advantages of the invention will become more apparent from the following detailed description of the invention when taken in conjunction with the accompanying drawings.

DESCRIPTION OF PREFERRED EMBODIMENTS

First Embodiment (1) Detailed Description of Configuration

Figure 1:
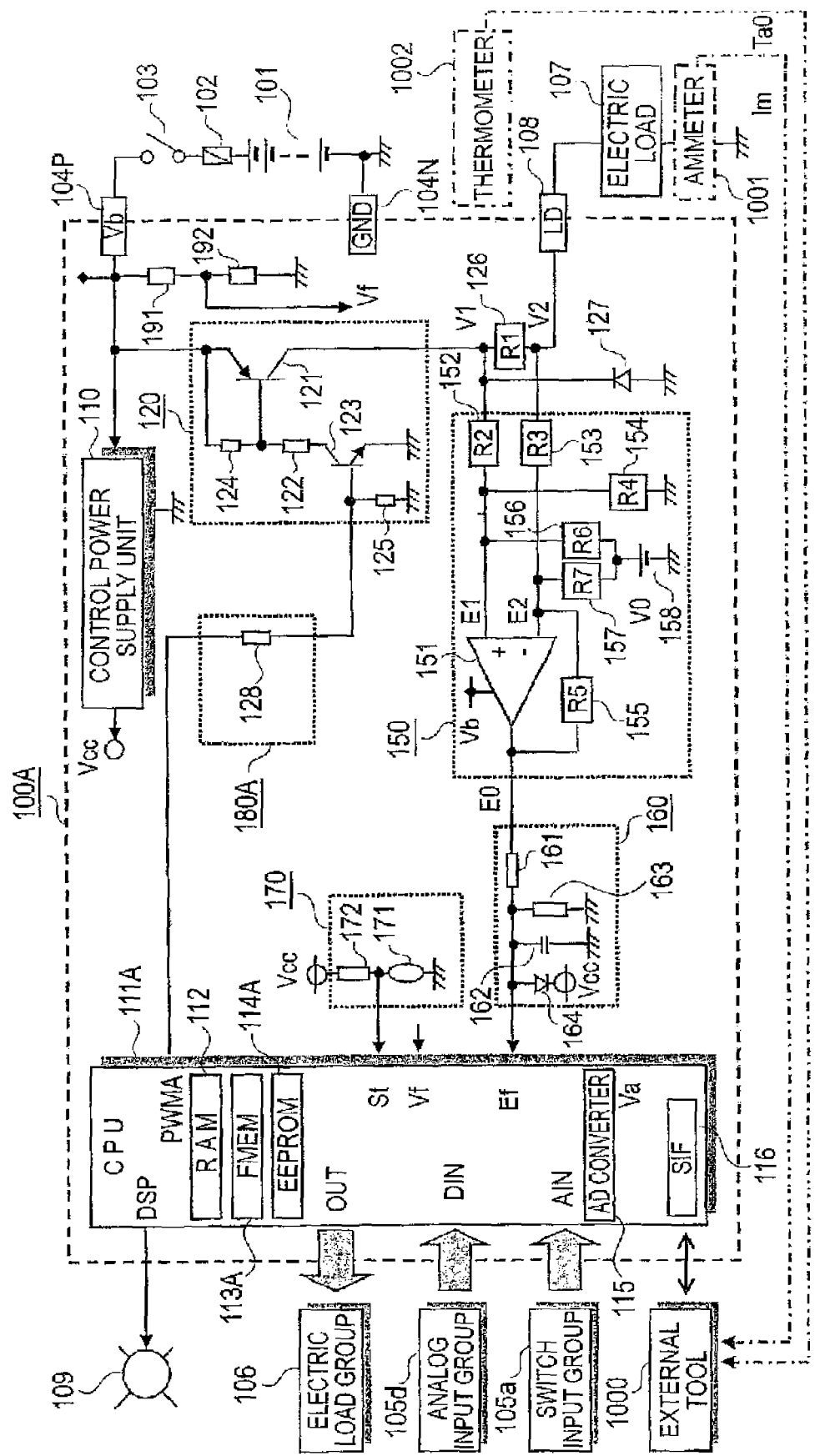
FIG. 1 is an overall circuit block diagram showing a current control device for an electric load according to a first embodiment of the invention.

FIG. 1 is an overall circuit block diagram showing a current control device for an electric load according to a first embodiment of the invention. Hereinafter, FIG. 1 will be described. FIG. 1 shows a current control device 100A for an electric load according to the first embodiment, and associated external devices. The current control device 100A is mounted on, for example, a vehicle, and controls a load current flowing in an electric load of the vehicle.

The current control device 100A includes a microprocessor 111A as a center component, to which power is supplied from a control power supply unit 110, and circuit parts, such as a switching circuit part 120, a current detection resistor 126, an amplifier circuit part 150 for current detection, a smoothing circuit 160, a temperature detection circuit 170, a drive signal circuit 180A, and the like. The current control device 100A is accommodated in a sealed casing (not shown). The current control device 100A has a power supply terminal 104P, a ground terminal 104N, and an output terminal 108.

First, as the external devices which are connected to the current control device 100A, a drive power supply circuit including a drive power supply 101, a fuse 102, and a power supply switch 103 is connected between the power supply terminal 104P and the ground terminal 104N. The drive power supply 101 is, for example, an in-vehicle battery, and the power supply switch 103 is, for example, a key switch of the vehicle.

A switch input group 105d including sensor switches and operation switches is connected to a digital input port DIN of the microprocessor 111A through a connector and an interface circuit (not shown).

An analog input group 105a including various analog sensors is connected to an analog input port AIN of the microprocessor 111A through a connector and an interface circuit (not shown).

An electric load group 106 including actuators and displays of the vehicle is connected to an output port OUT of the microprocessor 111A through a connector and an interface circuit (not shown).

Of the electric load group 106, an electric load 107, such as a linear solenoid, which is an inductive load and requires current control, is supplied with power from the output terminal 108 of the current control device 100A.

Of the electric load group 106, a warning indicator 109 which is abnormality warning means is driven by an abnormality warning output DSP of the microprocessor 111A.

In a calibration operation before shipment of a product, that is, the current control device 100A, external tool 1000 is connected to the microprocessor 111A through a serial interface circuit 116. Then, an output signal of an ammeter 1001 for calibration connected in series to the electric load 107 and an output signal of a thermometer 1002 for calibration for estimating the environmental temperature of the temperature sensor 171 of the temperature detection circuit 170 provided inside the current control device 100A are supplied to the microprocessor 111A through the external tool 1000 and transferred to a RAM memory 112 of the microprocessor 111A.

The temperature sensor for use in the thermometer 1002 for calibration is ideally provided in the vicinity of the temperature detection circuit 170 provided inside the current control device 100A. However, even when the temperature sensor for use in the thermometer 1002 for calibration is provided in the vicinity of the outside of the current control device 100A, if the temperature of the current control device 100A has not risen yet immediately after power is supplied to the current control device 100A, an actually measured external environmental temperature may be estimated to coincide with an internal environmental temperature, and the estimated internal environmental temperature may be converted and written in the RAM memory 112.

When the temperature detection circuit 170 inside the current control device 100A is calibrated at the component level in advance, it is not necessary to connect the thermometer 1002 for calibration. In this case, the environmental temperature in the vicinity of the current detection resistor 126 inside the current control device 100A can be obtained on the basis of a predetermined measured voltage-to-temperature characteristic based on the current detection resistor 126 inside the current control device 100A.

Inside the current control device 100A, the control power supply unit 110 generates a stabilized control power supply voltage Vcc of, for example, DC 5 (V) from a drive power supply voltage Vb of DC 10 to 16 (V) of the power supply terminal 104P, and supplies the control power supply voltage Vcc to the respective parts inside the current control device 100A.

The microprocessor 111A includes a RAM memory 112 for arithmetic processing, a program memory 113A, constituted by a nonvolatile flash memory, which can be electrically erased at once to allow writing and can be read, a data memory 114A, constituted by a nonvolatile EEPROM memory, which can be electrically written and read byte by byte, a multichannel AD converter 115, and an interface circuit 116 for serial communication, which are collaborated with each other.

When a part of area of the program memory 113A is used as a data memory, the data memory 114A is not required.

The switching circuit part 120 includes, for example, a switching element 121, which is a PNP junction type transistor, a serial circuit of a drive resistor 122 and an NPN type transistor 123 connected to a base circuit of the switching element 121, a stabilization resistor 124 connected to the base and emitter of the switching element 121, and a stabilization resistor 125 connected between the base and emitter of the transistor 123. One end, that is, an emitter, of the switching element 121 is connected to the power supply terminal 104P, and the other end, that is, a collector, is connected to the output terminal 108 of the current control device 100A through the current detection resistor 126 having a resistance value of R1 to supply power to the electric load 107. While a very small amount of part of a load current Im flowing in the electric load 107 flows in an input circuit of a differential amplifier 151, the remaining substantial all current flows in the current detection resistor 126, such that the load current Im is detected by the current detection resistor 126.

For the switching element 121, a P-channel field effect transistor, instead of a PNP junction type transistor, may be used.

A commutating diode 127 is connected in parallel to a serial circuit of the current detection resistor 126 and the electric load 107 which is an inductive load. The commutating diode 127 is connected in such a polarity as to permit a decay current of the electric load 107 to be returned or fed back when the switching element 121 is opened.

The transistor 123 is driven through a drive resistor 128 by a feedback control output PWMA from the microprocessor 111A. When the logical level of the feedback control output PWMA is "H", the transistor 123 and the switching element 121 are turned on.

In the current control device 100A of the first embodiment, the drive signal circuit 180A is simply formed by the drive resistor 128 which connects the transistor 123 and the feedback control output PWMA of the microprocessor 111A.

The amplifier circuit part 150 for current detection includes a differential amplifier 151 which is operated by the drive power supply voltage Vb as a power supply voltage, an input resistor 152 having a resistance value R2, an input resistor 153 having a resistance value of R3 (as theoretical design values, R2=R3), a voltage dividing resistor 154 having a resistance value of R4, a negative feedback resistor 155 having a resistance value of R5 (as theoretical design values, R4=R5), a bias resistor 156 having a resistance value of R6, a bias resistor 157 having a resistance value of R7 (as theoretical design values, R6=R7), and a bias power supply 158 which forms a bias correction circuit.

The input resistor 152 is connected between a positive terminal having V1 potential to ground of the current detection resistor 126 and a non-inverting input terminal having E1 potential to ground of the differential amplifier 151. The input resistor 153 is connected between a negative terminal having V2 potential to ground of the current detection resistor 126 and an inverting input terminal having E2 potential to ground of the differential amplifier 151. The voltage dividing resistor 154 is connected to the non-inverting input terminal of the differential amplifier 151 and the ground terminal. The negative feedback resistor 155 is connected between an output terminal having E0 potential to ground and the inverting input terminal of the differential amplifier 151. The bias resistor 156 is connected between the non-inverting input terminal of the differential amplifier 151 and the bias power supply 158. The bias resistor 157 is connected between the inverting input terminal of the differential amplifier 151 and the bias power supply 158. The bias power supply 158 is formed by a reference voltage generation circuit which is operated by an input voltage of the power supply terminal 104P, and generates a bias voltage having V0 potential to ground.

The bias power supply 158 prevents input potentials E1 and E2 of the differential amplifier 151 from becoming a negative potential when the switching element 121 is opened and the load current Im is returned or fed back to the commutating diode 127.

The smoothing circuit 160 includes a serial resistor 161, a capacitor 162, a parallel resistor 163, and a voltage limiting diode 164. The serial resistor 161 is connected between the output terminal of the differential amplifier 151 and an input terminal of the monitored voltage Ef of the microprocessor 111A. The capacitor 162 is connected between the input terminal of the monitored voltage Ef and the ground terminal. The parallel resistor 163 is connected in parallel to the capacitor 162. The voltage limiting diode 164 is connected between the input terminal of the monitored voltage Ef and a power supply line of the control power supply voltage Vcc by the control power supply unit 110. The voltage limiting diode 164 limits the value of the monitored voltage Ef to equal to or more than a value obtained by adding a forward voltage of the voltage limiting diode 164 to the control power supply voltage Vcc.

In the temperature detection circuit 170, the serial circuit of the temperature sensor 171 and the serial resistor 172 is supplied with power from the control power supply voltage Vcc. The temperature detection circuit 170 inputs a divided voltage by the temperature sensor 171 and the serial resistor 172 to the microprocessor 111A as a measured voltage St.

The temperature detection circuit 170 and the current detection resistor 126 are surface mounted components with an arrangement in which the temperature detection circuit 170 and the current detection resistor 126 are arranged to be adjacent to each other on the same electronic substrate, or with an arrangement in which the temperature detection circuit 170 and the current detection resistor 126 are arranged to be close to each other so as to form a single integrated surface mounted part mounted on the electronic substrate. The temperature detection circuit 170 is arranged to be closest to the current detection resistor 126 so as to be most easily influenced by a rise in temperature due to heat generation of the current detection resistor 126, in addition to outside air temperature and environmental temperature with an indirect temperature rise due to heat generating components including the switching element 121 and the control power supply unit 110.

The voltage dividing resistors 191 and 192 which form a power supply voltage measuring circuit are connected in series to each other and connected to the input terminal of the switching element 121. A voltage across of the voltage dividing resistor 192 is input to the microprocessor 111A as a power supply monitoring voltage Vf.

(2) Detailed Description of Actions and Operations

Next, actions and operations of the current control device 100A for an electric load according to the first embodiment configured as shown in FIG. 1 will be described in detail.

First, in FIG. 1, if the power supply switch 103 is closed and the drive power supply voltage Vb is applied from the drive power supply 101 to the control power supply unit 110, the control power supply unit 110 generates the stabilized control power supply voltage Vcc and supplies the stabilized control power supply voltage Vcc to the respective parts including the microprocessor 111A, such that the microprocessor 111A starts to operate.

Figure 2:
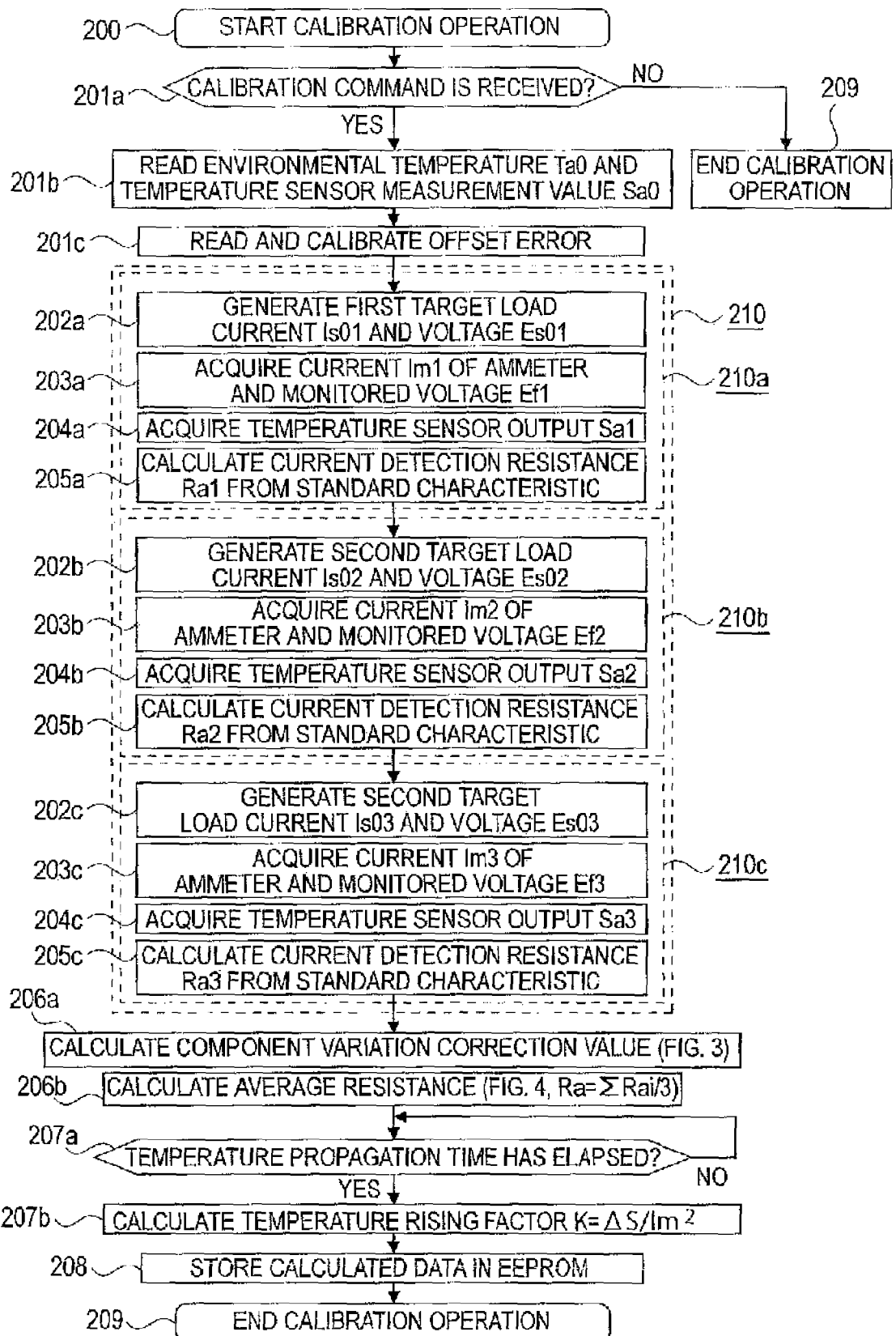
FIG. 2 is a flowchart illustrating calibration processing in the first embodiment.
Figure 8:
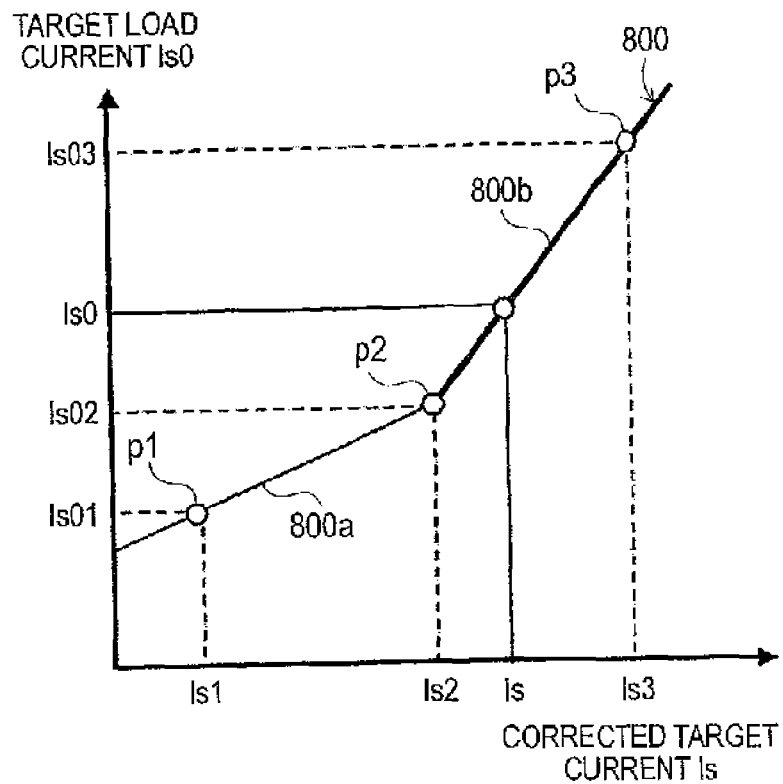
FIG. 8 is a diagram illustrating a calculation method of a corrected target current in the first embodiment.

In the final step of the manufacture and shipping line of a product, that is, the current control device 100A, a control program and control constants are written from the external tool 1000 to the program memory 113A. Temperature characteristic data 400 of the current detection resistor 126 shown in FIGS. 4 and 6 and temperature detection characteristic data 401 of the temperature sensor shown in FIG. 4 are stored in the nonvolatile program memory 113A. A calibration operation which will be described below with reference to FIG. 2 is carried out for all of the products which are successively manufactured. In the calibration operation, control characteristic data 300 for the current detection resistor 126 shown in FIG. 3 and target load current-to-corrected target current characteristic data 800 shown in FIG. 8 are stored in the nonvolatile EEPROM data memory 114A.

During an actual operation in which the current control device 100A is mounted on the vehicle, the microprocessor 111A generates, drive control signals for the electric load group 106, the electric load 107, and the warning indicator 109 in response to input signal information obtained from the analog input group 105a and the switch input group 105d, and the contents of an input/output control program stored in the program memory 113A.

Figure 5:
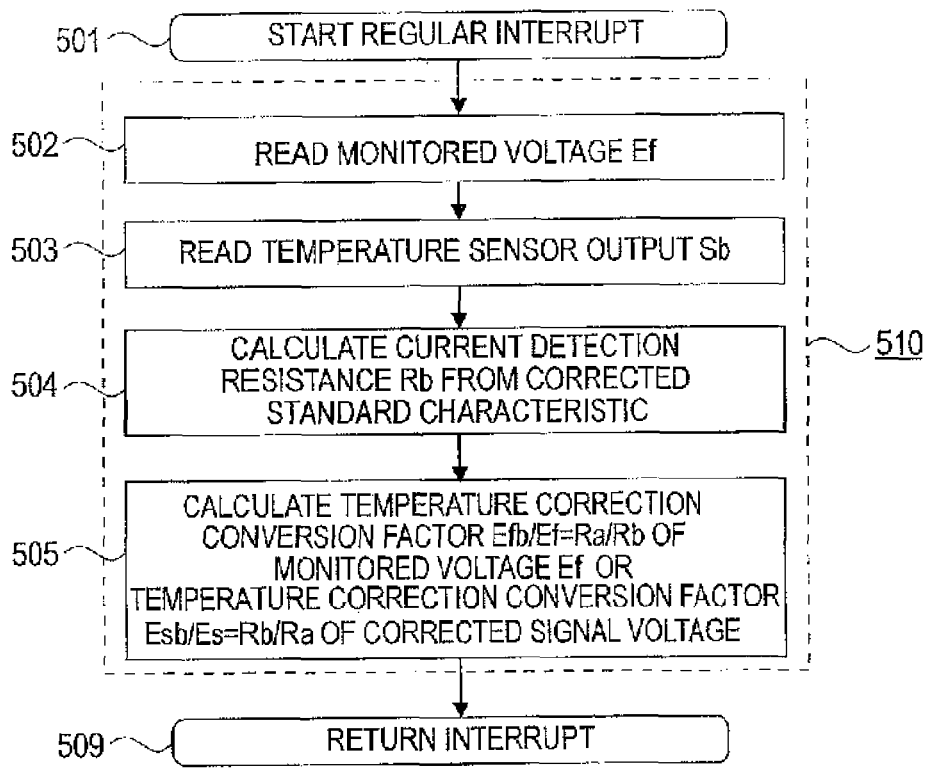
FIG. 5 is a flowchart showing a first conversion section in the first embodiment.
Figure 7:
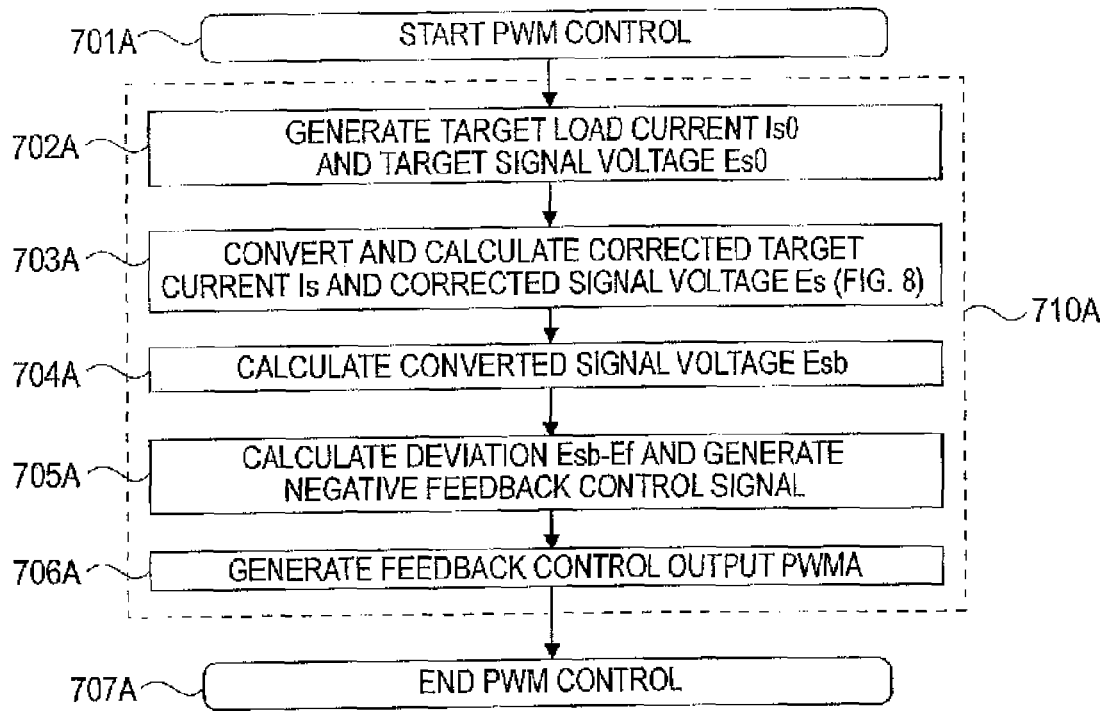
FIG. 7 is a flowchart showing a second conversion section in the first embodiment.

In particular, a target load current Is0 is generated for the electric load 107, and first and second conversion sections which will be described below with reference to FIGS. 5 and 7 are executed while monitoring the values of the temperature measured voltage St obtained from the temperature sensor 171, the monitored voltage Ef obtained from the amplifier circuit part 150 for current detection, and the power supply monitoring voltage Vf. Thus, a feedback control output PWMA which is a pulse width modulation signal is generated. Switching control of the switching element 121 is performed, and thus negative feedback control is performed such that the load current Im for the electric load 107 coincides with the target load current Is0.

FIG. 2 is a flowchart illustrating calibration processing of the current control device 100A according to the first embodiment. FIG. 2 will be described.

In FIG. 2, in Step 200, a calibration operation starts which is executed in the manufacturing and shipping line of a product, that is, the current control device 100A. Next, in Step 201a, it is determined whether or not a calibration command is received by the microprocessor 111A through the external tool 1000 connected in series to the microprocessor 111A. If no calibration command is received, "NO" determination is made and the process progresses to an operation end step 209.

If the calibration command is received, "YES" determination is made and the process progresses to Step 201b. Until the calibration command is generated, Steps 200, 201a, and 209 are circularly passed. In Step 201b, the value of the environmental temperature measured by the external thermometer 1002 for calibration is read as a calibration initial temperature Ta0 in the RAM memory 112 through the external tool 1000, and a measured voltage generated by the temperature sensor 171 is read as a calibration initial measured voltage Sa0 in the RAM memory 112 through the multichannel AD converter 115. Step 201b constitutes a temperature calibration section.

In Step 201b, a temperature calibration factor (Sa0/Ta0) is calculated from the calibration initial temperature Ta0 and the calibration initial measured voltage Sa0. In Step 208 which will be described below, the value of the temperature calibration factor (Sa0/Ta0) is transferred and stored in a data storage area of the nonvolatile program memory 113A or the nonvolatile data memory 114A.

As a result, when the temperature measured voltage of the temperature sensor 171 is St, the ambient temperature T of the temperature sensor 171 is calculated by Equation (1).

$$T=(Ta0/Sa0) \times St \qquad (1)$$

Here, St represents a measured voltage of the temperature sensor 171 at the ambient temperature T, Ta0 represents the calibration initial temperature which is an estimated ambient temperature measured by the thermometer 1002 for calibration, and Sa0 represents the calibration initial measured voltage which is a measured voltage of the temperature sensor 171 at the time of calibration.

When the temperature sensor 171 is calibrated by the temperature detection circuit 170 accurately at the component level, calibration by the thermometer 1002 for calibration is not required, and Step 201b may be omitted.

Next, Step 201c constitutes an offset error measurement section. In this step, at a timing when a measured current of the ammeter 1001 for calibration changes from 0 to a positive value, the value of a target load current Is00 by the microprocessor 111A is stored as an offset current. The offset current is measured by at least two kinds of large and small drive power supply voltages Vb.

Although accurate resistors are used for the input resistors 152 and 153, the bias resistors 156 and 157, the voltage dividing resistor 154, and the negative feedback resistor 155 inside the amplifier circuit part 150 for current detection, if errors occur in the resistance values, there is a problem in that the monitored voltage Ef is generated even though the load current Im is 0.

In particular, since the amplifier circuit part 150 for current detection is operated only by a positive power supply voltage, the differential amplifier 151 cannot generate a negative output voltage. For this reason, the respective resistors intentionally have a small difference such that the differential amplifier 151 does not generate a negative voltage. Thus, a positive offset current is inevitably generated by resistance errors.

The value of the offset current measured in Step 201c is transferred and stored in the data storage area of the nonvolatile program memory 113A or the nonvolatile data memory 114A in Step 208 which will be described below.

Next, Step 210 constitutes a linear calibration section which includes first, second, and third linear calibration sections 210a, 210b, and 210c. The respective steps forming the linear calibration sections 210a, 210b, and 210c are completed in a short time at a predetermined time interval.

In Step 202a which constitutes the first linear calibration section 210a, a first target load current Is01 and a first target signal voltage Es01 proportional to the first target load current Is01 are generated.

The target load current and the target signal voltage have a predetermined proportional relationship. For example, conversion is made such that, when the target load current has the maximum value Imax, the target signal voltage becomes 5 (V).

Next, in Step 203a, the value of a load current Im1 measured from the load current flowing in the electric load 107 in response to the first target load current Is01 by the ammeter 1001 for calibration is read in the RAM memory 112 through the external tool 1000. The value of a monitored voltage Ef1 corresponding to the load current Im1 at this timing is also read as reference information.

Next, in Step 204a, the first linear calibration section 210a reads the value of a measured voltage Sa1 of the temperature sensor 171 in the RAM memory 112.

Next, in Step 205a, a resistance value Ra1 of the current detection resistor 126 corresponding to the measured voltage Sa1 is estimated on the basis of standard temperature characteristic data 400 of the current detection resistor 126 stored in the program memory 113A in advance, and the resistance value Ra1 is read in the RAM memory 112.

In the second and third linear calibration sections 210b and 210c, similarly to the first linear calibration section 210a, second and third target load currents Is02 and Is03 which satisfy the relationship Is01<Is02<Is03 between the first target load current Is01, the second target load current Is02 and the third target load current Is03 are read and stored. In Steps 202b to 205b and Steps 202c to 205c, a load current Im2 corresponding to the second target load current Is02 and a load current Im3 corresponding to the third target load current Is03, monitored voltages Ef2 and Ef3 corresponding to the load currents Im2 and Im3, measured voltages Sa2 and Sa3 in the second and third linear calibration sections 210b and 210c, and resistance values Ra2 and Ra3 of the current detection resistor 126 corresponding to the measured voltages Sa2 and Sa3 are read and stored in the RAM memory 112.

The first, second, and third target load currents Is01, Is02, and Is03 set by the first, second, and third linear calibration sections 210a, 210b, and 210c, and the load currents Im1, Im2, and Im3 corresponding to the first, second, and third target load currents Is01, Is02, and Is03 are stored in the RAM memory 112 and then, in Step 208 described below, transferred to the nonvolatile data memory 114A. The relationship between the target load current including the first, second, and third target load currents Is01, Is02, and Is03, and the load current including the load currents Im1, Im2, and Im3 corresponding to the first, second, and third target load currents Is01, Is02, and Is03 are called control characteristic data 300.

Figure 3:
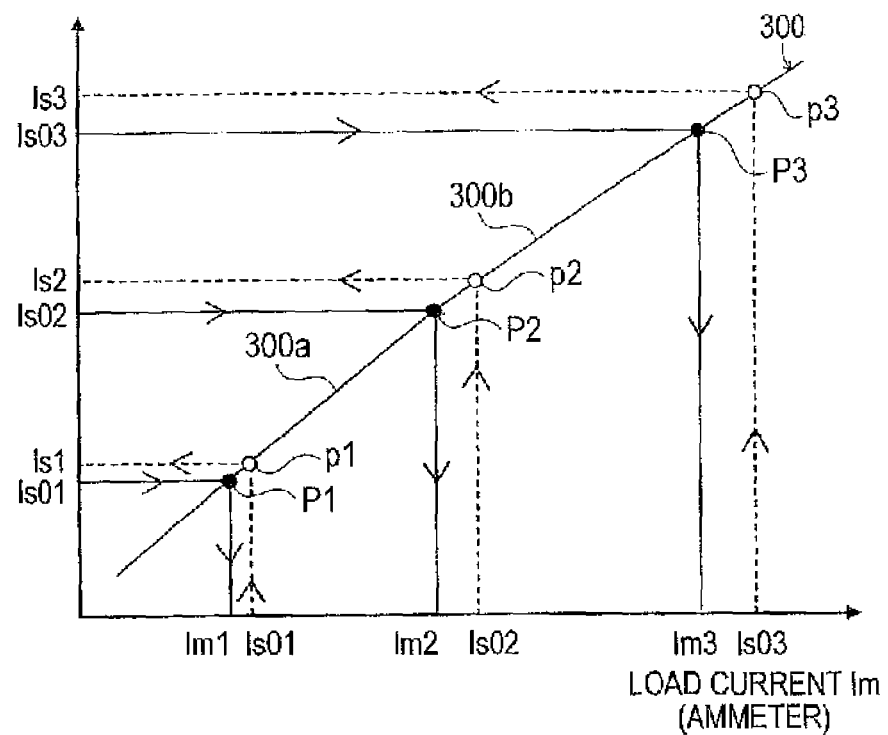
FIG. 3 is a graph illustrating control characteristic data in the first embodiment.
Figure 4:
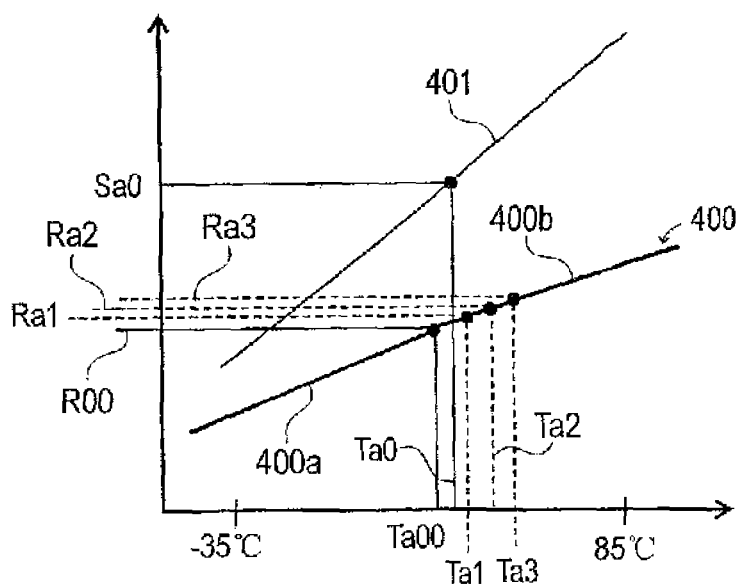
FIG. 4 is a graph illustrating temperature characteristic data in the first embodiment.

The control characteristic data 300 is shown in FIG. 3. The control characteristic data 300 shown in FIG. 3 has the vertical axis representing a target load current Is0 and the horizontal axis representing a load current Im, and shows the relationship between the first, second, and third target load currents Is01, Is02, and Is03 and the load currents Im1, Im2, and Im3 corresponding to the first, second, and third target load currents Is01, Is02, and Is03.

The control characteristic data 300 includes a first point P1 indicated by a black circle corresponding to the first target load current Is01 and the load current Im1, a second point P2 indicated by a black circle corresponding to the second target load current Is02 and the load current Im2, and a third point P3 indicated by a black circle corresponding to the third target load current Is03 and the load current Im3. The control characteristic data 300 has two polygonal characteristics of a line 300a which connects the first and second points P1 and P2, and a line 300b which connects the second and third points P2 and P3.

Next, in Step 206a, a variation correction value of a current detection circuit including the current detection resistor 126, the amplifier circuit part 150 for current detection, and the smoothing circuit 160 is calculated. The calculation method will be described on the basis of the control characteristic data 300 shown in FIG. 3.

In the control characteristic data 300 of FIG. 3, the load currents Im1, Im2, and Im3 on the horizontal axis corresponding to the first, second, and third target load currents Is01, Is02, and Is03 on the vertical axis should be basically equal to the target load currents Is01, Is02, and Is03, respectively. However, since self-heating occurs in the current detection resistor 126 due to the load currents Im1, Im2, and Im3, the load currents Im1, Im2, and Im3 include errors from the corresponding target load currents Is01, Is02, and Is03. In order to indicate the errors, the load currents Im1, Im2, and Im3 and the target load currents Is01, Is02, and Is03 are shown on the horizontal axis of FIG. 3. On the horizontal axis of FIG. 3, errors (Is01-Im1), (Is02-Im2), and (Is03-Im3) can be read. The errors are influenced by the increase in the resistance values Ra1, Ra2, and Ra3 due to self-heating of the current detection resistor 126. As the target load current Is0 increases to Is01, Is02, and Is03, the errors (Is01-Im1), (Is02-Im2), and (Is03-Im3) gradually increase.

In Step 206a, in order to correct the errors (Is01-Im1), (Is02-Im2), and (Is03-Im3), corrected target currents Is1, Is2, and Is3 corresponding to the target load currents Is01, Is02, and Is03 on the horizontal axis of FIG. 3 are calculated.

In FIG. 3, a point p1 indicated by a white circle represents a corrected target current Is1 corresponding to the target load current Is01 when the load current Im1 on the horizontal axis is replaced by the target load current Is01. A point p2 indicated by a white circle represents a corrected target current Is2 corresponding to the target load current Is02 when the load current Im2 on the horizontal axis is replaced by the target load current Is02. A point p3 indicated by a white circle represents a corrected target current Is3 corresponding to the target load current Is03 when the load current Im3 on the horizontal axis is replaced by the target load current Is03. It is understood from FIG. 3 that, when a load current Imi (where i=1, 2, and 3) is obtained, if a corrected target current Isi, instead of a target load current Is0i, is set, the load current Imi which is actually obtained coincides with the target load current Is0i.

Actually, in the control characteristic data 300, the same conversion is made by reading the value of the actually measured load current Imi on the horizontal axis as the target load current Is0i, and reading the target load current Is0i on the vertical axis as the corrected target current Isi.

In Step 206a of FIG. 2, the relationship between the target load current Is0i and the corrected target current Isi is calculated in such a manner. The relationship between the target load current and the corrected target current is called target load current-to-corrected target current characteristic data 800. The target load current-to-corrected target current characteristic data 800 is shown in FIG. 8 and will be described below.

Next, in Step 206b, the normal-temperature resistance Ra which is the resistance value of the current detection resistor 126 during the calibration operation is calculated by a method shown in FIG. 4.

In FIG. 4, the standard temperature characteristic data 400 of the current detection resistor 126 stored in the program memory 113A is adjusted such that reference resistance R00 is obtained at reference temperature Ta00, for example, at 25° C. When the horizontal axis represents temperature of the current detection resistor 126, and the vertical axis represents a resistance value of the current detection resistor 126, the standard temperature characteristic data 400 has resistance-temperature characteristics which are approximated by two polygonal lines 400a and 400b.

According to the temperature detection characteristic data 401 of the temperature sensor 171 indicated by a line, when the environmental temperature of the temperature sensor 171 is the calibration initial temperature Ta0, the temperature sensor 171 generates the calibration initial measured voltage Sa0.

In Steps 205a, 205b, and 205c, when the load current is Im1, Im2, and Im3, the ambient temperatures Ta1, Ta2, and Ta3 of the current detection resistor 126 are estimated from the values of the measured voltages Sa1, Sa2, Sa3 measured by the temperature sensor 171, and the resistance values Ra1, Ra2, and Ra3 of the current detection resistor 126 are calculated on the basis of the standard temperature characteristic data 400 of the current detection resistor 126. In Step 206b, the normal-temperature resistance Ra during the calibration operation is calculated as the average value of the resistance values Ra1, Ra2, and Ra3.

The ambient temperatures Ta1, Ta2, and Ta3 are calculated by replacing the measured voltage St in Equation (1) with Sa1, Sa2, and Sa3, respectively.

In Steps 205a, 205b, and 205c, the measured voltages Sa1, Sa2, and Sa3 may be simply stored, in Step 206b, an average measured voltage Sa=(Sa1+Sa2+Sa3)/3 may be calculated, and the normal-temperature resistance Ra may be calculated from an average temperature Ta corresponding to the average measured voltage Sa. In this case, the average temperature Ta is calculated by replacing the measured voltage St in Equation (1) with Sa.

Since the linear calibration section 210 is executed in a short time, there is little influence of heating of the current detection resistor 126 on a temperature rise in the temperature sensor 171, and the relationship Sa1≅Sa2≅Sa3≅Sa0 is established between the measured voltages. However, the temperature sensor 171 is gradually influenced by heating of the current detection resistor 126. For this reason, the normal-temperature resistance Ra at the time of normal-temperature calibration is calculated by the average value.

In contrast, the current detection resistor 126 which is a small product sensitively reacts with self-heating by the load current Im, the temperature is higher than the temperature detected by the temperature sensor 171. As a result, an actually measured load current Im which is smaller than the target load current Is0 is obtained. For this reason, taking into consideration the influence by self-heating of the current detection resistor, in Step 206a, the target load current-to-corrected target current characteristic data 800 is calculated, and the target load current Is0i is read as the corrected target current Isi.

Next, Step 207a constitutes a waiting step. In Step 207a, it waits for a predetermined time in a state where the command state of the third target load current Is03 in Step 202c is maintained, and the load current Im3 flows, and then the process progresses to Step 207b. In Step 207a, the waiting time is the time until the measured voltage of the temperature sensor 171 rises by the influence of self-heating of the current detection resistor 126, and the measured voltage Sm which is substantially saturated is obtained.

In Step 207b, a temperature rise value ΔS=Sm−Sa0 is calculated which is a difference between the measured voltage Sa0 of the temperature sensor 171 before the load current Im flows in the electric load 107 and the measured voltage Sm after the load current Im3 flows and it waits for a sufficient time in Step 207a. The ratio of the difference to the square value of the load current Im3 which is the cause for temperature rise of the temperature sensor 171 is written in the RAM memory 112 as a temperature rise factor K=(Sm−Sa0)/Im3².

If a load current for calculating the temperature rise factor K is the maximum load current Imax larger than Im3, the maximum temperature rise value can be obtained.

Next, Step 208 constitutes an initial data storage section, and data measured in Steps 201b, 201c, 210, 206a, 206b, and 207b is transferred and written in the nonvolatile EEPROM data memory 114A as initial calibration constants at once. The control characteristic data 300 and the target load current-to-corrected target current characteristic data 800 are also stored in the data memory 114A in Step 208.

The nonvolatile program memory 113A is a flash memory which includes a plurality of divided blocks to be erased block by block at once. When a specific divided block is allocated and used as a control constant storage area, the data memory 114A which is an EEPROM memory may be omitted. In this case, data measured in Steps 201b, 201c, 210, 206a, 206b, and 207b is written in the program memory 113A, and the control characteristic data 300 and the target load current-to-corrected target current characteristic data 800 are also stored in the program memory 113A in Step 208.

Next, in Step 209, the calibration operation ends. In this case, the calibration command in Step 201a is released, and in Step 201a, "NO" determination is made until a calibration command is given again. The above-described operations are summarized as follows. Step 201b constitutes a temperature sensor calibration section, Step 201c constitutes an offset error measurement section, Step 207b constitutes a temperature rise measurement section, Step 208 constitutes an initial data storage section, Step 210 constitutes a linear calibration section, and Steps 210a, 210b, and 210c respectively constitute the first, second, third linear calibration sections. These sections are implemented by a control program which is executed by the microprocessor 111A at the time of calibration for shipment.

Next, FIG. 5 will be described. FIG. 5 is a flowchart showing a first conversion section in the current control device 100A shown in FIG. 1.

In FIG. 5, in Step 501, during the actual operation in which the current control device 100A is mounted on the vehicle, an interrupt operation starts which is regularly executed by the microprocessor 111A.

Next, in Step 502, the monitored voltage Ef which is an output voltage of the amplifier circuit part 150 for current detection is read.

Next, in Step 503, an actual operation measured voltage Sb at the actual operation temperature Tb is read as a measured voltage of the temperature sensor 171. In Step 503, the actual operation temperature Tb is calculated by replacing the measured voltage St in Equation (1) with the actual operation measured voltage Sb.

Figure 6:
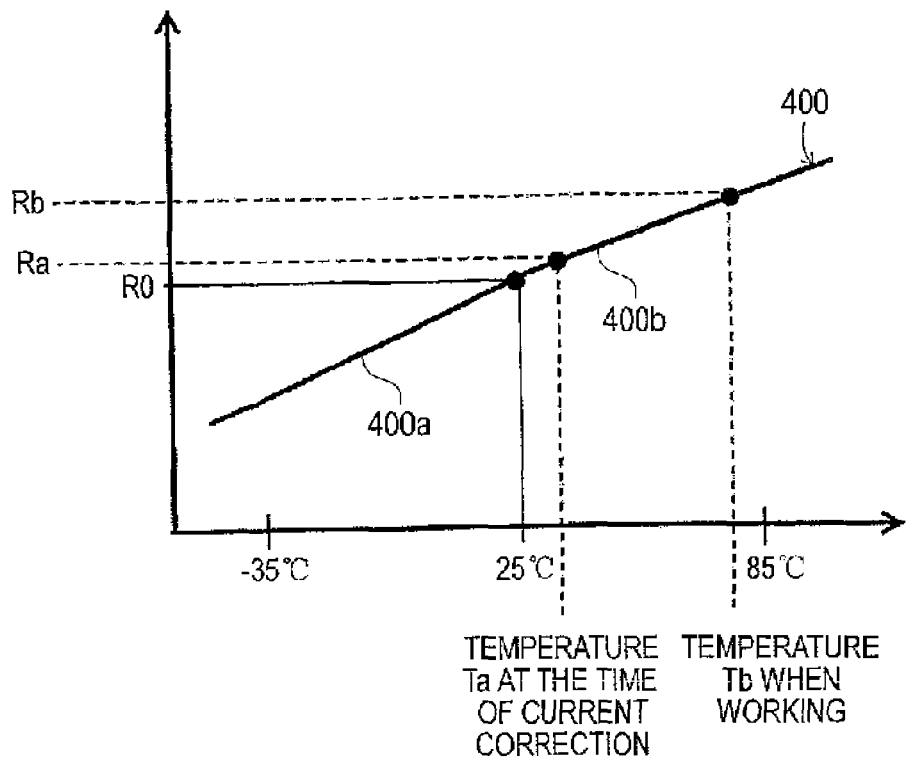
FIG. 6 is a diagram illustrating a calculation method of current detection resistance in the first embodiment.

Next, in Step 504, a resistance value Rb when the actual operation temperature is Tb is calculated from the standard temperature characteristic data 400 of the current detection resistor 126 shown in FIG. 6. The standard temperature characteristic data 400 shown in FIG. 6 is the same as the standard temperature characteristic data 400 shown in FIG. 4.

In FIG. 6, since the temperature Tb during the actual operation is the ambient temperature measured by the temperature sensor 171, the temperature of the current detection resistor 126 itself is slightly higher. Thus, the actual resistance value of the current detection resistor 126 is larger than the actual operation resistance Rb.

Next, in Step 505, a conversion factor, that is, a comparison value (Ra/Rb) is calculated which represents the ratio of the normal-temperature resistance Ra calculated in Step 206b of FIG. 2 and the actual operation resistance Rb calculated in Step 504 of FIG. 5, and stored as a temperature correction factor for calculating the converted monitored voltage Efb from the monitored voltage Ef, or an comparison value (Rb/Ra) which represents an inverse ratio is calculated and stored in the RAM memory 112 as a temperature correction factor for calculating the converted target current Isb from the corrected target current Is.

Next, in step 509, the interrupt returns. Step 510 including Steps 502 to 505 constitutes the first conversion section.

Next, FIG. 7 will be described. FIG. 7 is a flowchart showing a second conversion section in the current control device 100A shown in FIG. 1. A second conversion section 710A shown in FIG. 7 performs negative feedback control for the switching element 121 of the first embodiment.

In FIG. 7, in Step 701A, a pulse width modulation control operation starts.

Next, in Step 702A, the target load current Is0 and a target signal voltage Es0 are generated. The target signal voltage Es0 is obtained by applying a predetermined proportional factor to the target load current Is0.

Next, in Step 703A, a corrected target current Is and a corrected signal voltage Es corresponding to the target load current Is0 and the target signal voltage Es0 generated in Step 702A are calculated. The calculation method will be described on the basis of target load current-to-corrected target current characteristic data 800 shown in FIG. 8.

FIG. 8 shows target load current-to-corrected target current characteristic data 800 which represents the relationship between the target load current Is0 and the corrected target current Is. In FIG. 8, the vertical axis represents a target load current Is0i, and the horizontal axis represents a corrected target current Isi. The characteristic data 800 is calculated in Step 206a of FIG. 2, and stored in the data memory 114A or the nonvolatile program memory 113A in Step 208. The characteristic data 800 shows the relationship between the target load current Is0 and the corrected target current Is shown on the vertical axis of FIG. 3. The target load current-to-corrected target current characteristic data 800 is the correction characteristic of the target load current Is0 including a downward line segment 800a which is an extension line connecting a coordinate point (Is1,Is01) and a coordinate point (Is2,Is02) and an upward line segment 800b which is an extension line connecting a coordinate point (Is2,Is02) and a coordinate point (Is3,Is03).

The corrected target current Is when the target load current is Is0 can be calculated by Equations (2) and (3) as a linear interpolation value on the downward line segment 800a or the upward line segment 800b.

when Is0≤Is02

$$Is=(Is0-Is01)\times(Is2-Is1)/(Is02-Is01)+Is1 \qquad (2)$$

when Is0>Is02

$$Is=(Is0-Is02)\times(Is3-Is2)/(Is03-Is02)+Is2 \qquad (3)$$

The corrected signal voltage Es is calculated by Equation (4) by using the same proportional factor (Es0/Is0) as the target load current Is0 and the target signal voltage Es0.

$$Es=(Es0/Is0)\times Is \qquad (4)$$

Next, in Step 704A, with respect to the corrected signal voltage Es calculated in Step 703A, the converted signal voltage Esb is calculated by Equation (5) by using the conversion factor (Rb/Ra) calculated in Step 505 of FIG. 5.

$$Esb=(Rb/Ra)\times Es \qquad (5)$$

Next, in Step 705A, the value of the read monitored voltage Ef at the present time is subtracted from the converted signal voltage Esb calculated in Step 704A, a deviation voltage $\Delta E=Esb-Ef$ is calculated, and a negative feedback control signal voltage is generated in which a component proportional to the deviation voltage $\Delta E$ and a value proportional to the integral value of the deviation voltage $\Delta E$ are combined with each other.

Next, in Step 706A, a feedback control output PWMA is generated which is a pulse width modulation signal having an on/off ratio proportional to the negative feedback control signal voltage calculated in Step 705A, and switching control of the switching element 121 is performed such that the deviation voltage $\Delta E$ is 0, that is, the converted signal voltage Esb coincides with the monitored voltage Ef.

Next, Step 707A is an operation end step. In the operation end step 707A, another control program is executed, and the process returns to Step 701A in a predetermined time, such that the pulse width modulation control is continued.

Step 710A including Steps 702A to 706A constitutes a second conversion section.

The offset error measurement section which is executed in Step 201C of FIG. 2 measures the correspondence relationship between the error component from among the current proportional component and the error component of the monitored voltage Ef and the power supply monitoring voltage Vf before the linear calibration section 210 is executed. Measured data is written and stored as offset data in the nonvolatile program memory 113A or the nonvolatile data memory 114A as off set data. During the current control operation by the feedback control output PWMA, the value of the monitored voltage Ef or the value of the corrected target current Is0 is added or subtracted such that the error component is corrected in accordance with the value of the current power supply monitoring voltage Vf.

The temperature rise factor K calculated in Step 207a of FIG. 2 is used to estimate the temperature rise value of a region, in which the temperature detection circuit 170 is provided, based on the load current Im during the current control operation by the feedback control output PWMA. The environmental temperature inside the current control device 100A is estimated by the temperature detection circuit 170, and if the estimated environmental temperature is excessive, a warning indication is carried out by the warning indicator 109, or abnormality processing, such as a suppression operation for the electric load 107, is carried out.

(3) Description of Modification of First Embodiment

Figure 9:
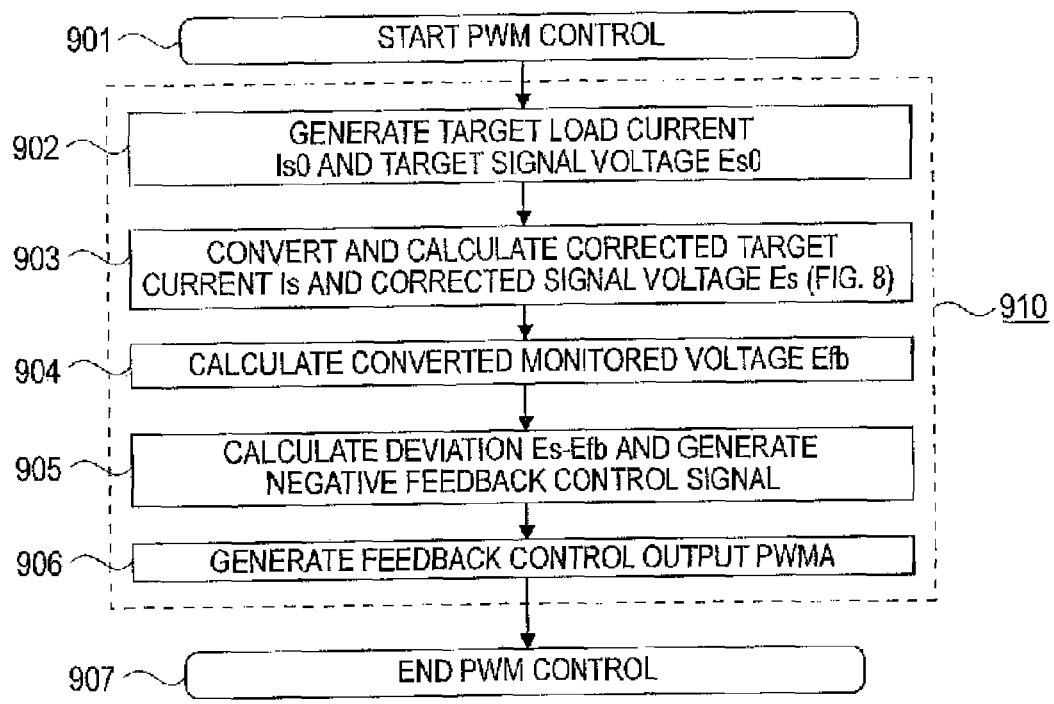
FIG. 9 is a flowchart showing a second conversion section in a modification of the first embodiment.

FIG. 9 is a flowchart showing a second conversion section 910 according to a modification of the first embodiment. In the modification of the first embodiment, the second conversion section 710A of the first embodiment is replaced with the second conversion section 910 shown in FIG. 9. In the modification of the first embodiment, other parts are the same as those in the first embodiment.

In the case of the negative feedback control for the switching element 121 of the first embodiment shown in FIG. 7, proportional integration control is carried out in accordance with a deviation signal voltage between the converted signal voltage Esb and the monitored signal voltage Ef. In contrast, in the case of negative feedback control for the switching element 121 of the modification of the first embodiment shown in FIG. 9, proportional integration control is carried out in accordance with a deviation signal voltage between the corrected signal voltage Es and the converted monitored voltage Efb.

In FIG. 9, Steps 901 to 907 correspond to Steps 701A to 707A of FIG. 7, but the contents of Steps 904 and 905 are different.

In FIG. 9, in Step 901, a pulse width modulation control operation starts. In Step 902, the target load current Is0 and the target signal voltage Es0 are generated. The target signal voltage Es0 is obtained by applying a predetermined proportional factor to the target load current Is0. In Step 903, the corrected target current Is and the corrected signal voltage Es corresponding to the target load current Is0 and the target signal voltage Es0 generated in Step 902 are calculated. The calculation method is as described above on the basis of the target load current-to-corrected target current characteristic data 800 shown in FIG. 8.

In Step 904 subsequent to Steps 901, 902, and 903, with respect to the read monitored voltage Ef at the present time, the converted monitored voltage Efb is calculated by Equation (6) by using the conversion factor (Ra/Rb) calculated in Step 505 of FIG. 5.

$$Efb=(Ra/Rb)\times Ef \qquad (6)$$

Next, in Step 905, the value of the converted monitored voltage Efb calculated in Step 904 is subtracted from the value of the corrected signal voltage. Es calculated in Step 903, the deviation voltage $\Delta E=Es-Efb$ is calculated, and the negative feedback control signal voltage is generated in which the component proportional to the deviation voltage $\Delta E$ and the value proportional to the integral value of the deviation value $\Delta E$ are combined with each other.

Next, in Step 906, the feedback control output PWMA is generated which is a pulse width modulation signal having an on/off ratio proportional to the negative feedback control signal voltage calculated in Step 905, and switching control of the switching element 121 is performed such that the deviation voltage $\Delta E$ is 0, that is, the converted monitored voltage Efb coincides with the corrected signal voltage Es.

Next, Step 907 is an operation end step. In the operation end step 907, another control program is executed, and the process returns to Step 901 in a predetermined time, such that the pulse width modulation control is continued. Thus, Step 910 including Steps 902 to 906 constitutes the second conversion section.

In Step 702A of FIG. 7 and Step 902 of FIG. 9, preferably, the power supply monitoring voltage Vf at the present time is read, and when the linear calibration section 210 of FIG. 2 is executed, the offset error based on a difference from a predetermined standard power supply voltage is corrected.

(4) Main Points and Features of First Embodiment

As understood from the above description, as a first main point, the current control device 100A for the electric load according to the first embodiment of the invention includes the power supply circuit part in which the switching element 121, the current detection resistor 126, and the electric load 107 to which power is supplied from the drive power supply 101 are connected in series to each other, and the control circuit part which controls the on/off ratio of the switching element 121 on the basis of the target load current Is0 of the electric load 107 and the load current Im flowing in the current detection resistor 126. The control circuit part includes the microprocessor 111A having the nonvolatile program memory 113A, the RAM memory 112 for arithmetic processing, and the multichannel AD converter 115, the amplifier circuit part 150 for current detection, the temperature detection circuit 170, and the drive signal circuit 180A. The nonvolatile program memory 113A includes the temperature characteristic data 400 which is one of an approximation formula and a data table regarding temperature-to-resistance value of the current detection resistor 126. The amplifier circuit part 150 amplifies the voltage across the current detection resistor 126 connected in series to the electric load 107, and generates the monitored voltage Ef which is based mainly on the current proportional component proportional to the load current Im for the electric load 107 and includes the error component. When the temperature close to the current detection resistor 126 is the normal-temperature ambient temperature Ta, the control characteristic data 300 which represents the correspondence relationship between the actually measured load current Im measured by the external ammeter for calibration and the target current Is0 is stored in one of the data storage area of the nonvolatile program memory 113A and the nonvolatile data memory 114A connected instead of the data storage area. The temperature detection circuit 170 includes the temperature sensor 171 and generates the measured voltages Sa and Sb corresponding to the normal-temperature ambient temperature Ta of the current detection resistor 126 and the actual operation ambient temperature Tb in operation, respectively, and the measured voltages Sa and Sb are input to the microprocessor 111A through the multichannel AD converter 115. The control circuit part generates the corrected signal voltage Es proportional to the corrected target current Is obtained by correcting the target load current Is0, and controls the on/off ratio of the switching element 121 such that either one selected from a first relationship in which the corrected signal voltage Es coincides with the converted monitored voltage Efb of the monitored voltage Ef, and a second relationship in which the converted signal voltage Esb proportional to the converted target current Isb coincides with the monitored voltage Ef is satisfied. The corrected target current Is corresponds to the target load current Is0 generated by the control circuit part when the actually measured load current Im corresponding to the target load current Is0 is replaced by the target load current Is0 in the control characteristic data 300. One of the converted monitored voltage Efb and the converted target current Isb is calculated on the basis of the comparison value (Ra/Rb) or (Rb/Ra) of the normal-temperature resistance Ra and the actual operation resistance Rb of the current detection resistor 126 obtained from the temperature characteristic data 400 in response to the normal-temperature ambient temperature Ta when the control characteristic data 300 is obtained and the actual operation ambient temperature Tb in operation.

As described above, according to the first main point of the first embodiment, even when initial calibration is carried out only under the normal-temperature environment, since the control characteristic data 300 and the accurate temperature characteristic data 400 of the current detection resistor are stored in advance, fluctuations of components and an accurate detected current under the actual operation high-temperature environment or actual operation low-temperature environment can be estimated. With regard to changes in the resistance value due to self-heating of the current detection resistor 126 caused by the load current Im and the influence by the temperature difference between the temperature of the current detection resistor 126 itself and the ambient temperature measured by the temperature detection circuit 170, the converted monitored voltage Efb or the converted target current Isb is calculated on the basis of the comparison value (Ra/Rb) or (Rb/Ra) of the normal-temperature resistance Ra obtained at the time of acquisition of the control characteristic data 300 with the actual operation resistance Rb obtained in the actual operation state, such that an accurate detected current can be estimated and current control errors can be suppressed.

Accurate current control can be performed by using the current detection resistor 126 which does not require accuracy comparatively, without using the accurate current detection resistor 126 which has no change in a resistance value with respect to change in temperature. As a result, products become inexpensive.

In the current control device for the electric load according to the first embodiment, as a second main point, the temperature detection circuit 170 and the current detection resistor 126 are surface mounted components with either one selected from a first arrangement in which the temperature detection circuit 170 and the current detection resistor 126 are arranged to be adjacent to each other on the same electronic substrate and a second arrangement in which the temperature detection circuit 170 and the current detection resistor 126 are arranged to be close to each other so as to form a single integrated surface mounted part mounted on the electronic substrate. The temperature detection circuit 170 is arranged to be closest to the current detection resistor 126 so as to be most easily influenced by a rise in temperature due to heat generation of the current detection resistor 126, in addition to outside air temperature and environmental temperature with an indirect temperature rise due to heat generating components including the switching element 121 and the control power supply unit 110. The resistance value R of the current detection resistor 126 has the reference resistance value R00 corresponding to the predetermined reference temperature Ta00, and the temperature characteristic data 400 is stored in the program memory 113A as one of an approximation formula and a data table of a standard characteristic which is approximated by at least two polygonal characteristics corresponding to an ambient temperature region higher than the reference temperature Ta00 and an ambient temperature lower than the reference temperature Ta00.

As described above, according to the second main point of the first embodiment, the temperature detection circuit 170 and the current detection resistor 126 are arranged to be close to each other, and the temperature characteristic data 400 of the current detection resistor 126 has at least two polygonal approximation characteristics.

Therefore, the temperature of the current detection resistor 126 is accurately estimated by the temperature detection circuit 170, such that degradation of current control accuracy due to change in the resistance value of the current detection resistor 126 can be suppressed.

In the current control device for the electric load according to the first embodiment, as a third main point, the nonvolatile program memory 113A further includes the control program which constitutes the linear calibration section 210, the initial data storage section 208, the first conversion section 510, and the second conversion section 710A or 910. The linear calibration section 210 receives the values of the first, second, and third load current Im1, Im2, and Im3 obtained by measuring the load current Im actually flowing in the electric load 107 and the current detection resistor 126 by the ammeter 1001 for calibration and generates the control characteristic data 300 when at least the target load currents Is01, Is02, and Is03 at three points are set as the target load current Is0 such that the relationship Is01<Is02<Is03 between the first target load current Is01, the second target load current Is02 and the third target load current Is03 is established. The initial data storage section 208 stores the target load current-to-corrected target current characteristic data 800 representing the relationship between the corrected target currents Is1, Is2, and Is3, which respectively control the first, second, and third load currents Im1, Im2, and Im3 to coincide with the target load currents Is01, Is02, Is03, and the target load currents Is01, Is02, and Is03 in one of the data storage area of the nonvolatile program memory 113A and the nonvolatile data memory 114A, and stores either one selected from the value of the normal-temperature measured voltage Sa corresponding to the normal-temperature ambient temperature Ta detected by the temperature detection circuit 170 when the linear calibration section 210 is executed and the value of the normal-temperature resistance Ra obtained from the temperature characteristic data 400 of the current detection resistor 126 in response to the value of the normal-temperature ambient temperature Ta in one of the data storage area of the nonvolatile program memory 113A and the nonvolatile data memory 114A. The first conversion section 510 reads the measured voltage Sb in operation detected by the temperature detection circuit 170 to estimate the actual operation ambient temperature Tb, calculates the value of the actual operation resistance Rb obtained from the temperature characteristic data 400 of the current detection resistor 126 at the actual operation ambient temperature Tb, and calculates one of the converted monitored voltage Efb=Ef×(Ra/Rb) corresponding to the value of the monitored voltage Ef and the converted target current Isb=Is×(Rb/Ra) from the corrected target current Is corresponding to the target load current Is0. The second conversion section 710A or 910 calculates the corrected target current Is corresponding to the target load current Is0 by a linear interpolation arithmetic operation on the basis of the target load current-to-corrected target current characteristic data 800 stored by the initial data storage section 208.

As described above, according to the third main point of the first embodiment, the control characteristic data 300 by the linear calibration section 210 is stored on the basis of calibration currents at the three points where polygonal approximation characteristics are obtained, and the load current is controlled by the first conversion setting section 510 based on the temperature characteristic data 400 of the current detection resistor 126 and the second conversion setting section 710A or 910 based on the linear calibration section 210.

Therefore, nonlinear control characteristics due to the increase in the temperature rise of the current detection resistor 126 proportional to the square of the load current Im can be corrected.

In the current control device for the electric load according to the first embodiment, as a fourth main point, the linear calibration section 210 includes the first, second, and third linear calibration sections 210a, 210b, and 210c corresponding to the first, second, and third target load currents Is01, Is02, and Is03. The first, second, and third linear calibration sections 210a, 210b, and 210c carry out a sequence of data acquisition processing on the basis of a predetermined time step in a short time, such that, even when the temperature of the current detection resistor 126 rises, the influence on the ambient temperature of the temperature detection circuit 170 is suppressed. The initial data storage section 208 calculates the average value of the measured voltages Sa1, Sa2, and Sa3 of the temperature detection circuit 170 measured by the first, second, and third linear calibration sections 210a, 210b, and 210c as the measured voltage Sa at the normal-temperature ambient temperature Ta, and the initial data storage section 208 performs one of calculating the normal-temperature resistance Ra from the temperature characteristic data 400 and storing the average value of the normal-temperature resistances Ra1, Ra2, and Ra3 calculated from the temperature characteristic data in response to the measured voltages Sa1, Sa2, and Sa3 as the normal-temperature resistance Ra.

As described above, according to the fourth main point of the first embodiment, three cycles of linear calibration by the three kinds of target load currents Is01, Is02, and Is03 are carried out in a short time, and the normal-temperature resistance Ra of the current detection resistor 126 is calculated and stored on the basis of the average value of the ambient temperatures measured by the respective cycles of linear calibration.

Therefore, the resistance value of the current detection resistor 126 under the normal-temperature environment can be accurately calculated without being influenced by measurement variations.

In the current control device for the electric load according to the first embodiment, as a fifth main point, the nonvolatile program memory 113A further includes the control program which constitutes the temperature sensor calibration section 201b. The temperature sensor calibration section 201b reads the value of the calibration initial measured voltage Sa0, which is the measured voltage by the temperature detection circuit 170, and the value of the calibration initial temperature Ta0 measured by the external thermometer 1002 for calibration prior to executing the linear calibration section 210, and the read data is written and stored in one of the data storage area of the nonvolatile program memory 113A and the nonvolatile data memory 114A.

As described above, according to the fifth main point of the first embodiment, the value of the calibration initial measured voltage Sa0 by the temperature detection circuit 170 and the value of the calibration initial temperature Ta0 measured by the external thermometer for calibration are read and stored prior to executing the linear calibration section 210.

Therefore, the fluctuations of the temperature detection circuit 170 under the normal-temperature environment can be reliably detected, and thus an accurate temperature detection output can be obtained.

In the current control device for the electric load according to the first embodiment, as a sixth main point, the nonvolatile program memory 113A further includes the control program which constitutes the offset error measurement section 201c. The drive power supply voltage Vb supplied from the drive power supply 101 is input to the microprocessor 111A as the power supply monitoring voltage of through the voltage dividing resistors 191 and 192 and the multichannel AD converter 115. The offset error measurement section 201c measures the correspondence relationship between the error component from among the current proportional component and the error component of the monitored voltage Ef and the power supply monitoring voltage Vf before the linear calibration section 210 is executed. The measured data is written and stored in one of the data storage area of the nonvolatile program memory 113A and the nonvolatile data memory 114A as offset data, and in the current control operation, one of the value of the monitored voltage Ef and the value of the corrected target current Is0 is added or subtracted so as to correct the error component in accordance with the present value of the power supply monitoring voltage Vf.

As described above, according to the sixth main point of the first embodiment, the error component of the monitored voltage Ef is corrected by the power supply monitoring voltage Vf and offset data.

Therefore, the offset errors due to the in-phase voltage of the amplifier circuit part 150 can be reduced.

In the current control device for the electric load according to the first embodiment, as a seventh main point, the microprocessor 111A generates one of the corrected signal voltage Es proportional to the corrected target current Is and the converted signal voltage Esb proportional to the converted target current Isb. The microprocessor 111A generates the negative feedback control signal voltage having a proportional component and a deviation integral component with respect to the deviation voltage represented by one of ΔE=(Esb−Ef) corresponding to the monitored voltage Ef and ΔE=(Es−Efb) corresponding to the converted monitored voltage Efb, and generates the feedback control output PWMA, which is a pulse width modulation signal of the duty proportional to the negative feedback control signal voltage, to perform switching control of the switching element 121 through the drive signal circuit 180A.

As described above, according to the seventh main point of the first embodiment, the microprocessor 111A generates the feedback control output PWMA, which is a pulse width modulation signal of the duty proportional to the negative feedback control signal voltage, to perform switching control of the switching element 121.

Therefore, the drive signal circuit 180A which is hardware connected between the microprocessor 111A and the switching element 121 can be made compact at low cost.

In the current control device for the electric load according to the first embodiment, as an eighth main point, the program memory 113A includes the control program which constitutes the temperature rise measurement section 207b. The temperature rise measurement section 207b continuously supplies a predetermined load current Im to the current detection resistor 126 when the linear calibration section 210 has been executed, reads the measured voltage Sm of the temperature detection circuit 170 when a predetermined time has elapsed, and measures the temperature rise value ΔS=Sm−Sa, which is a difference from the measured voltage Sa at the normal-temperature ambient temperature Ta, and the value of the continuously supplied load current Im as temperature rise data. The initial data storage section 208 writes and stores the temperature rise data in one of the data storage area of the nonvolatile program memory 113A and the nonvolatile data memory 114A.

As described above, according to the eighth main point of the first embodiment, the temperature rise value in the vicinity of the temperature detection circuit 170 corresponding to the load current Im is measured and stored by the difference between the measured voltage Sa of the temperature detection circuit 170 before the load current Im is continuously supplied and the measured voltage Sm after the load current Im is continuously supplied.

Therefore, in the actual operation state, the temperature rise value of the region where the temperature detection circuit 170 is provided based on the load current Im is estimated, and the environmental temperature inside the current control device 100A is estimated by the temperature detection circuit 170. If the estimated environmental temperature is excessive, the abnormality warning can be output or abnormality processing, such as the suppression operation of the load, can be carried out.

Figure 10:
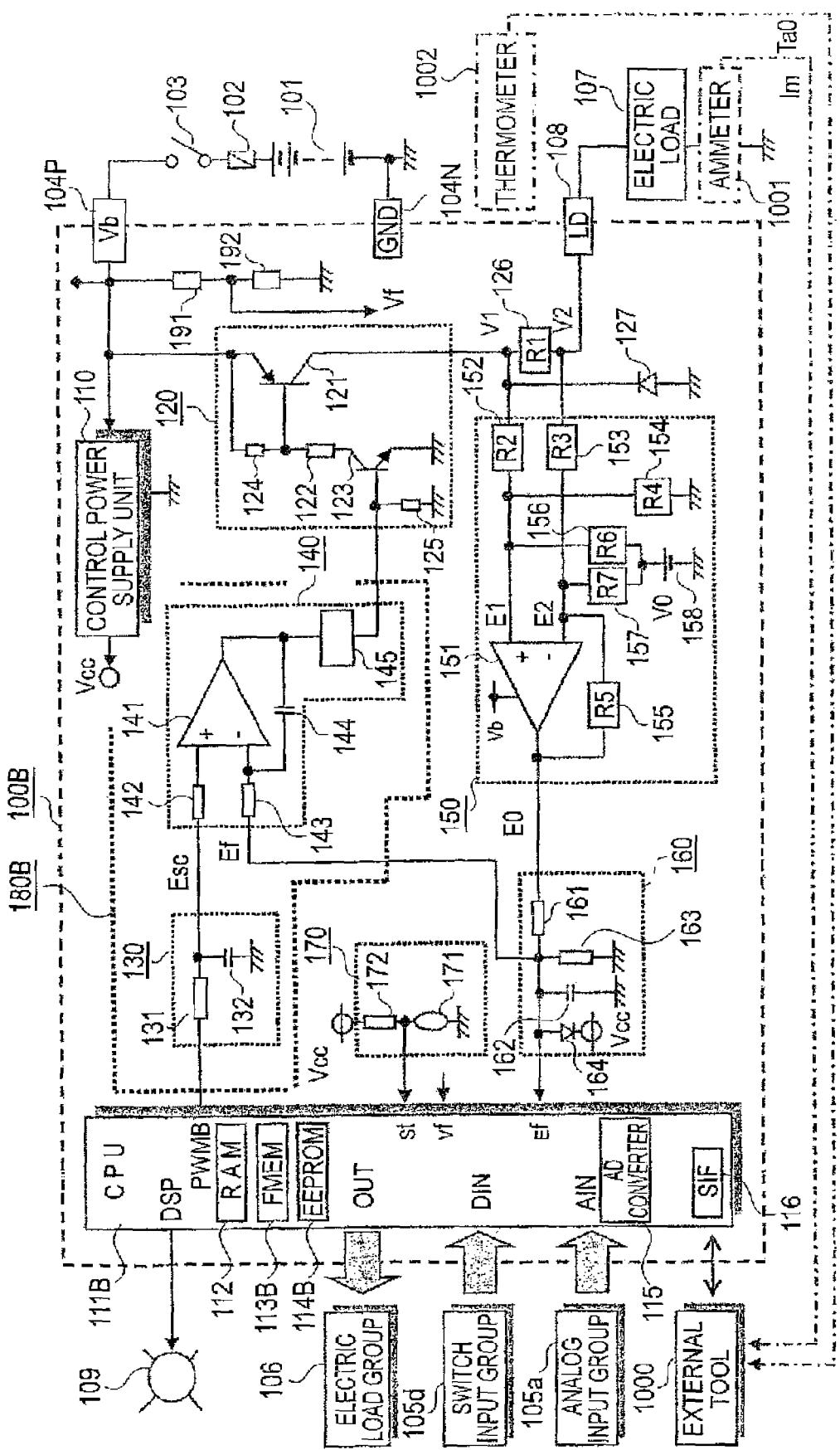
FIG. 10 is an overall circuit block diagram showing a current control device for an electric load according to a second embodiment of the invention.

Second Embodiment (1) Detailed Description of Configuration of Second Embodiment FIG. 10 is an overall circuit block diagram showing a current control device for an electric load according to a second embodiment of the invention. The current control device for an electric load according to the second embodiment includes a current control device 100B as a center component. The current control device for an electric load according to the second embodiment uses the current control device 100B, instead of the current control device 100A of the first embodiment. Hereinafter, FIG. 10 will be described focusing on the difference from that of FIG. 1. In the respective drawings, the same reference numerals represent the same parts or the equivalent parts.

In FIG. 10, the current control device 100B includes a microprocessor 111B, to which power is supplied from a control power supply unit 110, as a center component, and circuit parts, such as a switching circuit part 120, a target current setting circuit 130, a comparison deviation integration circuit 140, an amplifier circuit part 150 for current detection, a smoothing circuit 160, a temperature detection circuit 170, and the like. The current control device 100B is accommodated in a sealed casing (not shown). The target current setting circuit 130 and the comparison deviation integration circuit 140 constitute a drive signal circuit 180B.

Similarly to FIG. 1, as the external devices which are connected to the current control device 100B, a drive power supply circuit including a drive power supply 101, a fuse 102, and a power supply switch 103 is connected between a power supply terminal 104P and a ground terminal 104N.

A switch input group 105d, an analog input group 105a, an electric load group 106, an electric load 107, such as a linear solenoid, which requires current control, and a warning indicator 109 are also connected in the same manner as in FIG. 1.

In the calibration operation before shipment of a product, that is, the current control device 100B, an external tool 1000 is connected to the microprocessor 111B through a serial interface circuit 116. An output signal of an ammeter 1001 for calibration connected in series to the electric load 107 and an output signal of a thermometer 1002 for calibration for estimating the temperature inside the current control device 100B are supplied to the microprocessor 111B through the external tool 1000 and transferred to a RAM memory 112.

Inside the current control device 100B, the target current setting circuit 130 includes a smoothing resistor 131 and a smoothing capacitor 132, and constitutes a smoothing circuit which smoothes a set control output PWMB which is a pulse width modulation signal generated by the microprocessor 111B to obtain a target signal voltage Esc=αVcc. Here, α is a pulse duty.

The pulse duty α is the ratio of a period, in which the set control output PWMB is at the logical level "H" and a control power supply voltage Vcc is generated as an output voltage, to a pulse cycle.

The target current setting circuit 130 is used as an analog conversion section which replaces a DA converter, and is constituted such that the target signal voltage Esc is obtained as an analog value by one pulse-train output point of the microprocessor 111B. The pulse duty α does not directly coincide with a pulse duty which is an on/off control ratio of the switching element 121.

The comparison deviation integration circuit 140 includes a comparator 141, an input resistor 142, an input resistor 143, an integration capacitor 144, and a hysteresis circuit 145. The target signal voltage Esc output from the target current setting circuit 130 is connected to an non-inverting input of the comparator 141 through the input resistor 142. The monitored voltage Ef output from the smoothing circuit 160 is connected to an inverting input of the comparator 141 through the input resistor 143. The integration capacitor 144 is connected between the output terminal and the inverting input terminal of the comparator 141. Thus, an integral voltage output of the deviation value between the target signal voltage Esc and the monitored voltage Ef is obtained at the output end of the comparator 141.

The hysteresis circuit 145 is constituted by a positive feedback comparison circuit which reliably turns on/off the switching element 121. Specifically, when the output voltage of the comparator 141 exceeds, for example, 3 (V), the output logical level becomes "H", such that a transistor 123 of the switching circuit part 120 is driven and turned on. When the output voltage of the comparator 141 decreases to be equal to or less than, for example, 2.5 (V), the output logical level returns to "L", such that the transistor 123 is turned off.

Instead of the hysteresis circuit 145, an output voltage of a sawtooth wave signal generation circuit which is synchronized with the pulse cycle of the set control output PWMB of the microprocessor 111B may be compared with an output voltage of the comparator 141, and the transistor 123 may be turned on/off in accordance with the comparison result. In this case, the switching cycle of the switching element 121 coincides with the pulse cycle of the set control output PWMB of the microprocessor 111B.

The control power supply unit 110, the voltage dividing resistors 191 and 192 which constitute a power supply voltage measuring circuit, the switching circuit part 120, the amplifier circuit part 150 for current detection, the smoothing circuit 160, and the temperature detection circuit 170 are constituted in the same manner as in FIG. 1.

As described above, in the current control device for an electric load according to the second embodiment of FIG. 10, the drive signal circuit 180B includes the target current setting circuit 130 and the comparison deviation integration circuit 140. The microprocessor 111B generates the set control output PWMB which is a pulse width modulation signal of the on/off duty proportional to the converted signal voltage Esb described below, and negative feedback control is performed outside the microprocessor 111B.

The monitored voltage Ef is input to the microprocessor 111B as reference information.

(2) Detailed Description of Actions and Operations

Next, actions and operations of the current control device 100B for an electric load according to the second embodiment of the invention configured as shown in FIG. 10 will be described in detail.

First, in FIG. 10, if the power supply switch 103 is closed and the drive power supply voltage Vb is applied from the drive power supply 101 to the control power supply unit 110, the control power supply unit 110 generates a stabilized control power supply voltage Vcc and supplies the stabilized control power supply voltage Vcc to the respective parts including the microprocessor 111B, such that the microprocessor 111B starts to operate.

In the final step of the manufacturing and shipping line of the current control device 100B, a control program and control constants are written from the external tool 1000 to a program memory 113B. The temperature characteristic data 400 of the current detection resistor 126 shown in FIGS. 4 and 6 and the temperature detection characteristic data 401 of the temperature sensor shown in FIG. 4 are stored in the nonvolatile program memory 113B. The calibration operation which has been described with reference to FIG. 2 is carried out for all of the products which are successively manufactured, that is, the current control devices 100B. During the calibration operation, the control characteristic data 300 of the current detection resistor 126 shown in FIG. 3 and the target load current-to-corrected target current characteristic data 800 shown in FIG. 8 are stored in an EEPROM data memory 114B or the nonvolatile program memory 113B.

During the actual operation in which the current control device 100B is mounted on the vehicle, the microprocessor 111B generates drive control signals for the electric load group 106, the electric load 107, and the warning indicator 109 in accordance with input signal information obtained from the analog input group 105a and the switch input group 105d, and the contents of the input/output control program stored in the program memory 113B.

Figure 11:
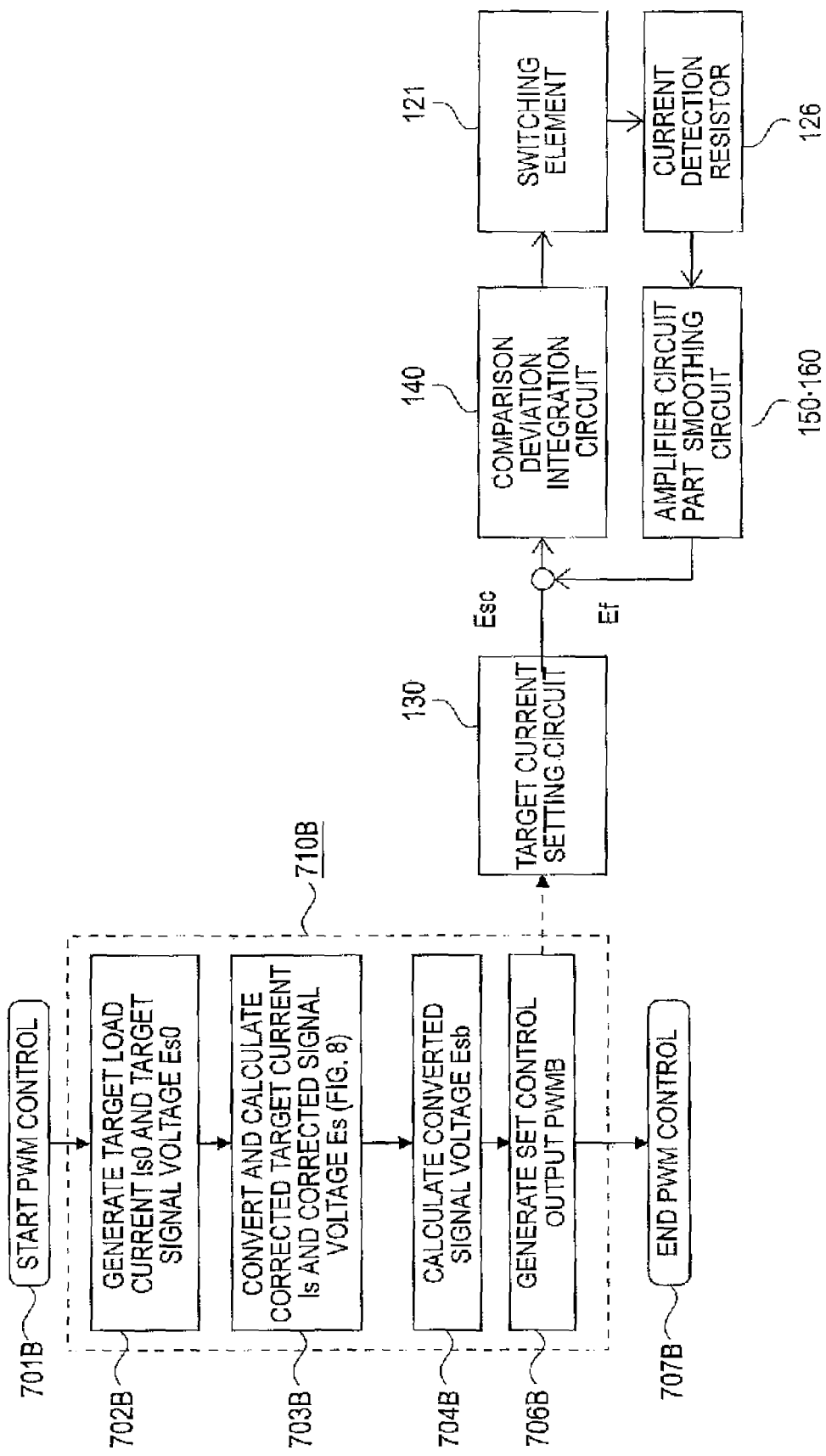
FIG. 11 is a flowchart showing pulse width modulation control in the second embodiment.

In particular, the target load current Is0 is generated for the electric load 107, and the first conversion section 510 which has been described with reference to FIG. 5 and a second conversion section 710B which will be described with reference to FIG. 11 are executed while monitoring the values of the temperature measured voltage St obtained from the temperature sensor 171, the monitored voltage Ef obtained from the amplifier circuit part 150 for current detection, and the power supply monitoring voltage Vf. Thus, the set control output PWMB which is a pulse width modulation signal is generated. Switching control of the switching element 121 is performed through the drive signal circuit 180B, and thus negative feedback control is performed such that the load current Im of the electric load 107 coincides with the target load current Is0.

The flowchart of FIG. 5 showing the first conversion section 510 is also applied to the second embodiment of FIG. 10. However, with regard to the temperature correction conversion factor in Step 505 of FIG. 5, in the second embodiment, only the comparison value (Rb/Ra) for obtaining the converted signal voltage Esb is calculated. This is because the microprocessor 111B is not directly involved in negative feedback control using the monitored voltage Ef, and even when the converted monitored voltage Efb of the monitored voltage Ef is calculated, the converted monitored voltage Efb cannot be reflected in negative feedback control.

FIG. 11 is a flowchart showing pulse width modulation control in the current control device for an electric load according to the second embodiment. FIG. 11 shows the second conversion section 710B in the second embodiment as a center component. The pulse width modulation control in the current control device for an electric load according to the second embodiment will be described with reference to FIG. 11.

Referring to FIG. 11, in Step 701B, a pulse width modulation operation starts.

Next, in Step 702B, the target load current Is0 and the target signal voltage Es0 are generated. The target signal voltage Es0 is obtained by applying a predetermined proportional factor to the target load current Is0.

Next, in Step 703B, the corrected target current Is and the corrected signal voltage Es corresponding to the target load current Is0 and the target signal voltage Es0 generated in Step 702B are calculated. The calculation method of the corrected target current Is is as described above on the basis of the target load current-to-corrected target current characteristic data 800 shown in FIG. 8.

Next, in Step 704B, with respect to the corrected signal voltage Es calculated in Step 703B, the converted signal voltage Esb is calculated by Equation (7) on the basis of the comparison value (Rb/Ra) calculated in Step 505 of FIG. 5.

$$Esb=(Rb/Ra) \times Es \quad (7)$$

Next, in Step 706B, the set control output PWMB which is a pulse width modulation signal having an on/off ratio proportional to the converted signal voltage Esb calculated in Step 704B is generated to perform switching control of the switching element 121.

Next, Step 707B is an operation end step. In the operation end step 707B, another control program is executed, and the process returns to Step 701B in a predetermined time, such that the pulse width modulation control is continued.

The target current setting circuit 130 smoothes the set control output PWMB, which is a pulse width modulation signal, to generate the target signal voltage Esc as an analog signal which coincides with the converted signal voltage Esb. The comparison deviation integration circuit 140 generates the deviation voltage ΔEb=(Esc−Ef) between the target signal voltage Esc and the monitored voltage Ef, and generates the negative feedback control signal voltage having the proportional component proportional to the deviation voltage ΔEb and the deviation integral component. Switching control of the switching element 121 is performed by the negative feedback control signal voltage such that the target signal voltage Esc and the monitored voltage Ef coincide with each other. Thus, negative feedback control is performed such that the load current Im which coincides with the target load current Is0 is obtained.

In Step 702B of FIG. 11, preferably, the power supply monitoring voltage Vf at the present time is read, and when the linear calibration section 210 of FIG. 2 is executed, an offset error based on a difference from a predetermined standard power supply voltage is corrected.

Step 710B including Steps 702B to 706B constitutes the second conversion section 710B.

(3) Main Points and Features of Second Embodiment

As understood from the above description, as a first main point, the current control device 100B for the electric load according to the second embodiment includes the power supply circuit part in which the switching element 121, the current detection resistor 126, and the electric load 107 to which power is supplied from the drive power supply 101 are connected in series to each other, and the control circuit part which controls the on/off ratio of the switching element 121 on the basis of the target load current Is0 of the electric load 107 and the load current Im flowing in the current detection resistor 126. The control circuit part includes the microprocessor 111B having the nonvolatile program memory 113B, the RAM memory 112 for arithmetic processing, and the multichannel AD converter 115, the amplifier circuit part 150 for current detection, the temperature detection circuit 170, and the drive signal circuit 180B. The nonvolatile program memory 113B includes the temperature characteristic data 400 which is one of an approximation formula and a data table regarding temperature-to-resistance value of the current detection resistor 126. The amplifier circuit part 150 for current detection amplifies the voltage across the current detection resistor 126, and generates the monitored voltage Ef which is based mainly on the current proportional component proportional to the load current Im for the electric load 107 and includes the error component. When the temperature close to the current detection resistor 126 is the normal-temperature ambient temperature Ta, the control characteristic data 300 which represents the correspondence relationship between the actually measured load current Im measured by the external ammeter for calibration and the target load current Is0 is stored in one of the data storage area of the nonvolatile program memory 113B and the nonvolatile data memory 114B connected instead of the data storage area. The temperature detection circuit 170 includes the temperature sensor 171 and generates the measured voltages Sa and Sb corresponding to the normal-temperature ambient temperature Ta of the current detection resistor 126 and the actual operation ambient temperature Tb in operation, respectively, and the measured voltages Sa and Sb are input to the microprocessor 111B through the multichannel AD converter 115. The control circuit part generates the corrected signal voltage Es proportional to the corrected target current Is obtained by correcting the target load current Is0, and controls the on/off ratio of the switching element 121 such that the converted signal voltage Esb proportional to the converted target current Isb coincides with the monitored voltage Ef. The corrected target current Is corresponds to the target load current Is0 generated by the control circuit part when the actually measured load current Im corresponding to the target load current Is0 is replaced by the target load current IS0 in the control characteristic data. The converted target current Isb is calculated on the basis of the comparison value (Rb/Ra) between the normal-temperature resistance Ra and the actual operation resistance Rb of the current detection resistor 126 obtained from the temperature characteristic data 400 in response to the normal-temperature ambient temperature Ta when the control characteristic data 300 is obtained and the actual operation ambient temperature Tb in operation.

As described above, according to the first main point of the second embodiment, even when initial calibration is carried out only under the normal-temperature environment, since the control characteristic data 300 and the accurate temperature characteristic data 400 of the current detection resistor 126 are stored in advance, fluctuations of components and an accurate detected load current under the actual operation high-temperature environment or actual operation low-temperature environment can be estimated. With regard to changes in the resistance value due to self-heating of the current detection resistor 126 caused by the load current Im and the influence by the temperature difference between the temperature of the current detection resistor 126 itself and the ambient temperature measured by the temperature detection circuit 170, the converted target current Isb is calculated on the basis of the comparison value of the normal-temperature resistance (Ra) obtained at the time of acquisition of the control characteristic data 300 with the actual operation resistance (Rb) obtained in the actual operation state, such that an accurate detected load current can be estimated and current control errors can be suppressed.

Accurate current control can be performed by using the current detection resistor 126 which does not require accuracy comparatively, without using the accurate current detection resistor 126 which has no change in a resistance value with respect to change in temperature. As a result, products become inexpensive.

In the current control device for the electric load according to the second embodiment, as a second main point, the nonvolatile program memory 113B includes the control program which constitutes the linear calibration section 210, the initial data storage section 208, the first conversion section 510, and the second conversion section 710B. The linear calibration section 210 receives the values of the first, second, and third load currents Im1, Im2, and Im3 obtained by measuring the load current Im actually flowing in the electric load 107 and the current detection resistor 126 by the ammeter 1001 for calibration and generates the control characteristic data 300 when at least three predetermined target load currents Is01, Is02, and Is03 are set as the target load current Is0 such that the relationship Is01<Is02<Is03 between the first target load current Is01, the second target load current Is02 and the third target load current Is03 is established. The initial data storage section 208 stores the target load current-to-corrected target current characteristic data 800 representing the relationship between the corrected target currents Is1, Is2, and Is3, which respectively control the first, second, and third load currents Im1, Im2, and Im3 to coincide with the target load currents Is01, Is02, Is03, and the target load currents Is01, Is02, and Is03 in one of the data storage area of the nonvolatile program memory 113B and the nonvolatile data memory 114B, and stores either one selected from the value of the normal-temperature measured voltage Sa corresponding to the normal-temperature ambient temperature Ta detected by the temperature detection circuit 170 when the linear calibration section 210 is executed and the value of the normal-temperature resistance Ra obtained from the temperature characteristic data 400 of the current detection resistor 126 in response to the value of the normal-temperature ambient temperature Ta in one of the data storage area of the nonvolatile program memory 113B and the nonvolatile data memory 114B. The first conversion section 510 reads the measured voltage Sb in operation detected by the temperature detection circuit 170 to estimate the actual operation ambient temperature Tb, calculates the value of the actual operation resistance Rb obtained from the temperature characteristic data 400 of the current detection resistor 126 at the actual operation ambient temperature Tb, and calculates the converted target current Isb=Is×(Rb/Ra) from the value of the corrected target current Is corresponding to the target load current Is0. The second conversion section 710B calculates the corrected target current Is corresponding to the target load current Is0 by a linear interpolation arithmetic operation on the basis of the target load current-to-corrected target current characteristic data 800 stored by the initial data storage section 208.

As described above, according to the second main point of the second embodiment, the control characteristic data 300 by the linear calibration section 210 is stored on the basis of three calibration currents having polygonal approximation characteristics, and the load current is controlled by the first conversion setting section 510 based on the temperature characteristic data 400 of the current detection resistor 126 and the second conversion setting section 710B based on the linear calibration section 210.

Therefore, nonlinear control characteristics due to the increase in the temperature rise of the current detection resistor 126 proportional to the square of the load current Im can be corrected.

In the current control device for the electric load according to the second embodiment, as a third main point, the microprocessor 111B generates the converted signal voltage Esb proportional to the converted target current Isb, and generates the set control output PWMB, which is a pulse width modulation signal of the duty proportional to the converted signal voltage Esb, to perform switching control of the switching element 121 through the drive signal circuit 180B. The drive signal circuit 180B includes the target current setting circuit 130 which smoothes the set control output PWMB to generate the target signal voltage Esc which coincides with the converted signal voltage Esb, and the comparison deviation integration circuit 140 which generates the negative feedback control signal voltage including the proportional component and the deviation integral component with respect to the deviation voltage ΔEb=(Esc−Ef) between the target signal voltage Esc generated by the target current setting circuit 130 and the monitored voltage Ef, and performs switching control of the switching element 121 in response to the negative feedback control signal voltage.

As described above, according to the third main point of the second embodiment, the microprocessor 111B generates the set control output PWMB which is a pulse width modulation signal of the duty proportional to the converted signal voltage Esb to perform switching control of the switching element 121 through the target current setting circuit 130 and the deviation integration circuit 140.

Therefore, negative feedback control is performed by the drive signal circuit 180B which is hardware provided outside the microprocessor 111B. As a result, the control burden imposed on the microprocessor 111B can be reduced.

Third Embodiment (1) Detailed Description of Configuration of Third Embodiment

Figure 12:
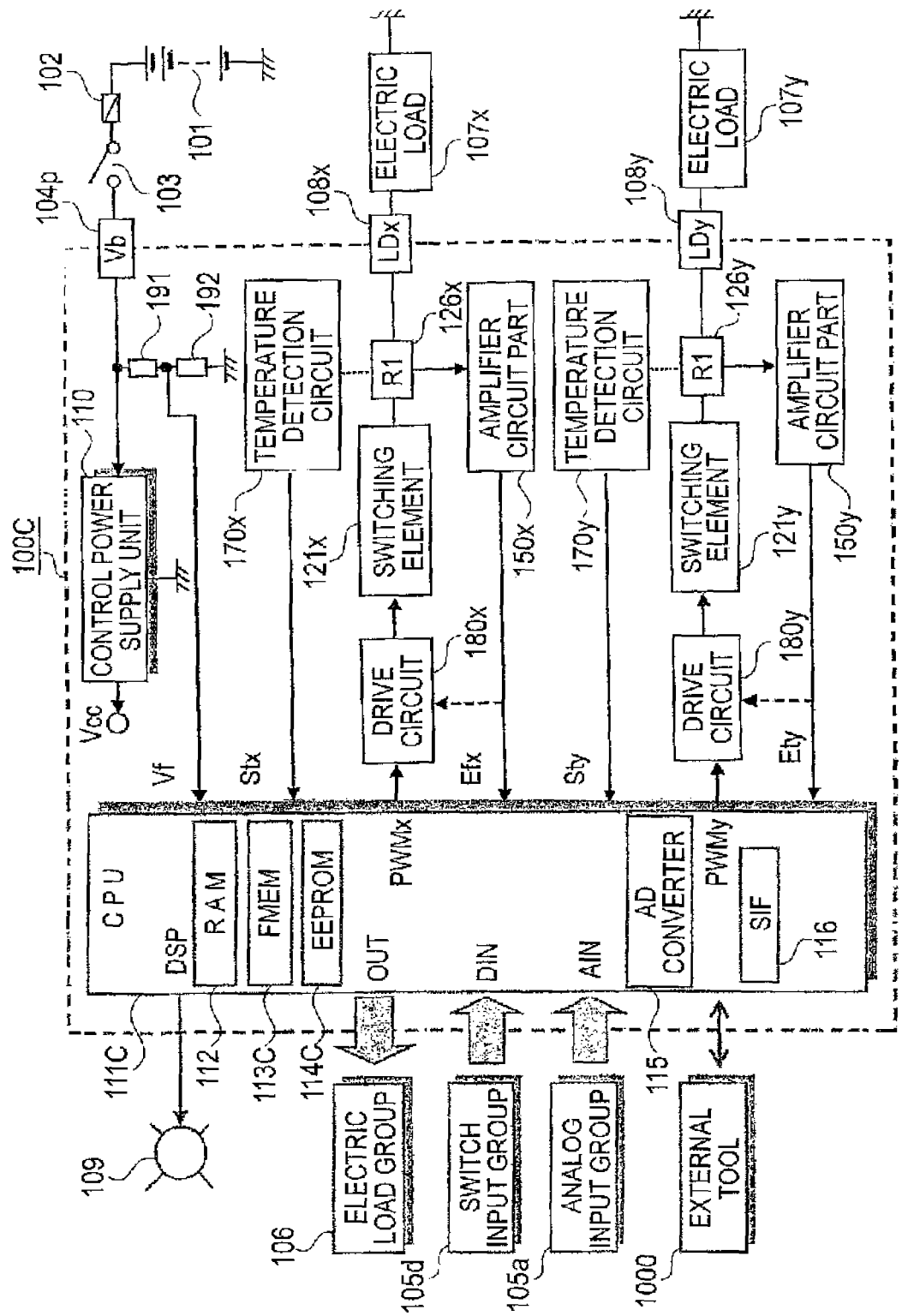
FIG. 12 is an overall circuit block diagram showing a current control device for an electric load according to a third embodiment.

FIG. 12 is an overall circuit block diagram showing a current control device for an electric load according to a third embodiment of the invention. The current control device for an electric load according to the third embodiment includes a current control device 100C as a center component. The current control device for an electric load according to the third embodiment, uses the current control device 100C, instead of the current control devices 100A and 100B in the first and second embodiments. Hereinafter, FIG. 12 will be described focusing on the differences from those in FIGS. 1 and 10.

The current control device for an electric load according to the third embodiment shown in FIG. 12 includes first and second electric loads 107x and 107y which are the same as the electric load 107 in the first and second embodiments, first and second current detection resistors 126x and 126y which correspond to the first and second electric loads 107x and 107y, first and second switching elements 121x and 121y which are the same as the switching element 121 in the first and second embodiments and are constituted with the switching circuit part 120, first and second amplifier circuit parts 150x and 150y for current detection which include the amplifier circuit part 150 for current detection and the smoothing circuit 160 in the first and second embodiments and first and second temperature detection circuits 170x and 170y which are the same as the temperature detection circuit 170 in the first and second embodiments. The first and second drive signal circuits 180x and 180y are equivalent to the drive signal circuit 180A of FIG. 1 or the drive signal circuit 180B of FIG. 10. In the respective drawings, the same reference numerals represent the same parts or the equivalent parts.

Each of the first and second amplifier circuit parts 150x and 150y for current detection includes the amplifier circuit part 150 for current detection and the smoothing circuit 160 configured same as those in the first and second embodiments. The first and second amplifier circuit parts 150x and 150y respectively generate monitored voltages Efx and Efy on the voltages across the first and second current detection resistors 126x and 126y, and inputs the monitored voltages Efx and Efy to a microprocessor 111C. The first and second temperature detection circuits 170x and 170y respectively detect the temperatures close to the current detection resistors 126x and 126y, generate measured voltages Stx and Sty, and input the measured voltages Stx and Sty to the microprocessor 111C. The microprocessor 111C outputs pulse width modulation control outputs PWMx and PWMy for the first and second switching elements 121x and 121y, and controls the on/off ratios of the switching elements 121x and 121y through the drive signal circuits 180x and 180y.

In FIG. 12, the current control device 100C includes the microprocessor 111C, to which power is supplied from the control power supply unit 110, as a center component, and circuit parts, such as the first and second switching elements 121x and 121y, the first and second drive signal circuits 180x and 180y, the first and second amplifier circuit parts 150x and 150y for current detection including a smoothing circuit, and the first second temperature detection circuits 170x and 170y. The current control device 100C is accommodated in a sealed casing (not shown).

Similarly to FIGS. 1 and 10, as the external devices which are connected to the current control device 100C, a drive power supply circuit including a drive power supply 101, a fuse 102, and a power supply switch 103 is connected between a power supply terminal 104P and a ground terminal 104N.

A switch input group 105d, an analog input group 105a, an electric load group 106, electric loads 107x and 107y, such as linear solenoids, which require current control, and a warning indicator 109 are connected in the same manner as in FIGS. 1 and 10.

In the calibration operation before shipment of a product, that is, the current control device 100C, an external tool 1000 is connected to the microprocessor 111C through a serial interface circuit 116. An output signal of an ammeter 1001 for calibration connected in series to the electric loads 107x and 107y and an output signal of a thermometer 1002 for calibration for estimating the temperature inside the current control device 100C are supplied to the microprocessor 111C through the external tool 1000 and transferred to a RAM memory 112 which will be described below.

Inside the current control device 100C, the microprocessor 111C includes with a RAM memory 112 for arithmetic processing, a program memory 113C, constituted by a flash memory, which can be electrically erased at once to allow writing and can be read, a data memory 114C, constituted by an EEPROM memory, which can be electrically written and read byte by byte, a multichannel AD converter 115, and an interface circuit 116 for serial communication.

The control outputs PWMx and PWMy which are pulse width modulation signals generated by the microprocessor 111C are in the format of one of a negative feedback control output, such as the feedback control output PWMA in FIG. 1, and the set control output PWMB in FIG. 10.

The power supply monitoring voltage Vf, the temperature measured voltages Stx and Sty, and the monitored voltages Efx and Efy are input to the microprocessor 111C through the multichannel AD converter 115.

When the control outputs PWMx and PWMy are negative feedback control outputs, such as the feedback control output PWMA in FIG. 1, the monitored voltages Efx and Efy are input to the microprocessor 111C, but are not input to the drive signal circuits 180x and 180y.

When the control outputs PWMx and PWMy are negative feedback control outputs, such as the set control output PWMB in FIG. 10, the monitored voltages Efx and Efy are input to the microprocessor 111C as reference information, and are input to the drive signal circuits 180x and 180y as negative feedback signals.

(2) Detailed Description of Actions and Operations

Next, actions and operations of the current control device 100C for an electric load according to the third embodiment configured as shown in FIG. 12 will be described in detail.

First, in FIG. 12, if the power supply switch 103 is closed and the drive power supply voltage Vb is applied from the drive power supply 101 to the control power supply unit 110, the control power supply unit 110 generates a stabilized control power supply voltage Vcc and supplies the stabilized control power supply voltage Vcc to the respective parts including the microprocessor 111C, such that the microprocessor 1110 starts to operate.

In the final step of the manufacturing and shipping line of the current control device 100C, a control program and control constants are written from the external tool 1000 to the program memory 113C. The temperature characteristic data 400 of the current detection resistors 126x and 126y shown in FIGS. 4 and 6 and the temperature detection characteristic data 401 of the temperature sensors 171 of the temperature detection circuits 170x and 170y shown in FIG. 4 are stored in the nonvolatile program memory 113C. The temperature characteristic data 400 differs between the current detection resistors 126x and 126y, but for convenience, the same reference numeral 400 is used. The temperature detection characteristic data 401 differs between the temperature sensors 171 of the temperature detection circuits 170x and 170y, but for convenience, the same reference numeral is used. The calibration operation which has been described with reference to FIG. 2 is carried out for all of the current control devices 100C which are successively manufactured. During the calibration operation, the control characteristic data 300 of the current detection resistors 126x and 126y and the target load current-to-corrected target current characteristic data 800 are stored in the EEPROM data memory 114C or the nonvolatile program memory 113C. The control characteristic data 300 and the target load current-to-corrected target current characteristic data 800 differ between the current detection resistors 126x and 126y, but for convenience, the same reference numerals are used.

During the actual operation in which the current control device 100C is mounted on the vehicle, the microprocessor 111C generates drive control signals for the electric load group 106, the electric loads 107x and 107y, and the warning indicator 109 in response to input signal information obtained from the analog input group 105a and the switch input group 105d, and the contents of the input/output control program stored in the program memory 113C.

In particular, the target load currents Is0x and Is0y are respectively generated for the electric loads 107s and 107y, and the first conversion section 510 which has been described above with reference to FIG. 5 and the second conversion section 710A, 910, or 710B which has been described above with reference to FIG. 7, 9, or 11 are executed while monitoring the values of the temperature measured voltages Stx and Sty obtained from the temperature sensors 171x and 171y, the monitored voltages Efx and Efy obtained from the amplifier circuit parts 150x and 150y for current detection, and the power supply monitoring voltage Vf. Thus, the control outputs PWMx and PWMy which are pulse width modulation signals are generated. Switching control of the switching elements 121x and 121y is performed through the drive signal circuits 180x and 180y, and thus negative feedback control is performed such that the load currents Imx and Imy of the electric loads 107x and 107y respectively coincide with the target load currents Is0x and Is0y.

Figure 13:
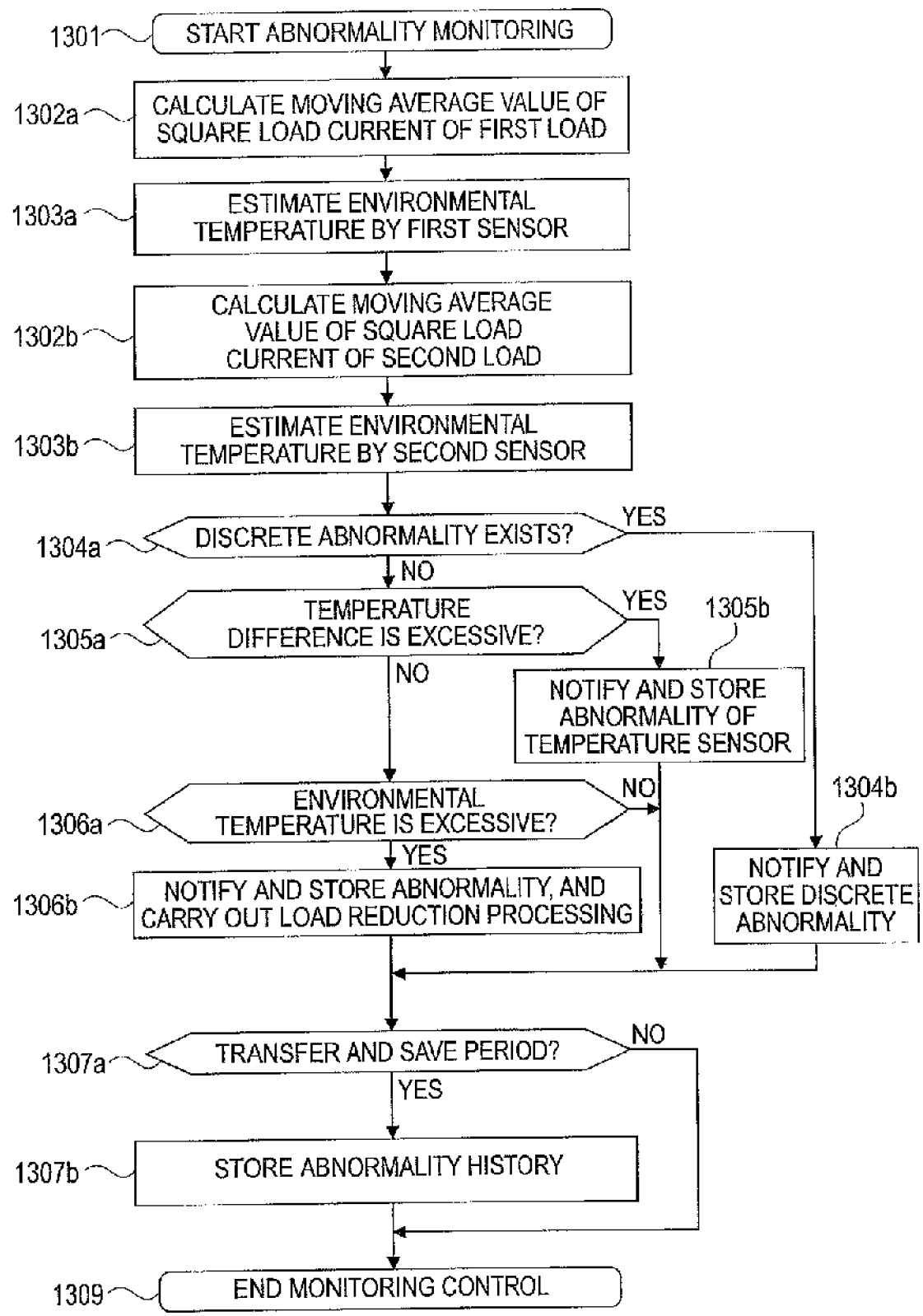
FIG. 13 is a flowchart illustrating abnormality monitoring in the third embodiment.

FIG. 13 is a flowchart showing an abnormality monitoring operation in the third embodiment. An abnormality monitoring operation in the third embodiment will be described with reference to FIG. 13. In FIG. 13, in Step 1301, an abnormality monitoring operation starts regarding the ambient temperatures of the current detection resistors 126x and 126y by the microprocessor 111C.

Next, in Step 1302a, the value of the first target load current Is01 corresponding to the first load current Im1 of the first electric load 107x or the value of the first load current Im1 calculated inversely from the first monitored voltage Ef1 is regularly sampled and read, and the square value of the read and sampled value is stored in a first-in-first-out data table over a predetermined period, the total average value of the square value of the load current stored in the relevant data table is calculated as a moving average square value.

Next, in Step 1303a, the present temperature rise value is calculated on the basis of the temperature rise factor K calculated and stored in Step 207b of FIG. 2, and the temperature rise value is subtracted from the ambient temperature detected by the first temperature detection circuit 170x to calculate a first environmental temperature of the region where the first temperature detection circuit 170x is provided.

Next, in Steps 1302b and 1303b, a second environmental temperature regarding the current detection resistor 126y for the second electric load 107y is calculated. Data tables which operate in the same manner as Steps 1302a and 1303a are provided. The data tables are constituted by the RAM memory 112.

Steps 1303a and 1303b respectively constitute first and second environmental temperature estimation sections. The calculated first and second environmental temperatures are the values which are respectively obtained by subtracting the temperature rise amounts due to self-heating of the first and second current detection resistors 126x and 126y from the ambient temperatures of the first and second current detection resistors 126x and 126y detected by the first and second temperature detection circuits 170x and 170y. Thus, in the normal state, the first and second environmental temperatures are substantially the same environmental temperature.

Next, Step 1304a is a determination step which constitutes a discrete abnormality determination section. If a discrete abnormality occurs, "YES" determination is made and the process progresses to Step 1304b. If no abnormality occurs, "NO" determination is made and the process progresses to Step 1305a.

In Step 1304a which constitutes a discrete abnormality determination section, when the ambient temperatures detected by the first and second temperature detection circuits 170x and 170y are outside a predetermined permissible range value, it is determined that a discrete abnormality occurs. The predetermined permissible range value is the upper and lower limit values of the actual operation temperature which are obtained by adding the maximum temperature rise values of the first and second current detection resistors 126x and 126y to the upper limit values of the upper and lower limit values of the environmental temperature to be applied.

In Step 1304a, if one of the ambient temperatures detected by the first and second temperature detection circuits 170x and 170y is excessively larger than the other ambient temperature, and the difference between the ambient temperatures exceeds the maximum temperature rise values of the first and second current detection resistors 126x and 126y, abnormality determination is made.

In Step 1304b, occurrence of a discrete abnormality is warned by the warning indicator 109, and an abnormality occurrence state is temporarily stored in the RAM memory 112. Then, the process progresses to Step 1307a.

In Step 1305a which constitutes a sensor abnormality determination section, at the time of abnormality determination, "YES" determination is made and the process progresses to Step 1305b. When there is no abnormality, "NO" determination is made and the process progresses to Step 1306a.

In Step 1305a, when one of the first and second environmental temperatures estimated in Steps 1303a and 1303b is excessively larger than the other ambient temperature, it is determined that at least one of the first and second temperature detection circuits 170x and 170y is abnormal.

In Step 1305b, occurrence of abnormality of the temperature sensor is warned by the warning indicator 109, and an abnormality occurrence state is temporarily stored in the RAM memory 112. Then, the process progresses to Step 1307a.

In Step 1306a which constitutes a temperature abnormality determination section, at the time of abnormality determination, "YES" determination is made and the process progresses to Step 1306b. When there is no abnormality, "NO" determination is made and the process progresses to Step 1307a.

In Step 1306a, when in Step 1305a, abnormality determination is not made, if the first and second environmental temperatures estimated in Steps 1303a and 1303b are both excessive, it is determined that the environmental temperature is excessive.

In Step 1306b, occurrence of abnormality of the environmental temperature is warned by the warning indicator 109, and an abnormality occurrence state is temporarily stored in the RAM memory 112. Then, the process progresses to Step 1307a.

In Step 1306b, driving of the electric load which is the causes of the rise of the internal temperature of the current control device 100C stops to suppress the internal environmental temperature.

In Step 1307a, it is determined whether a transfer and save period (not shown) is reached or not. Usually, "NO" determination is made and the process progresses to an operation end step 1309. Meanwhile, "YES" determination is made immediately before the operation stops or regularly, and the process progresses to Step 1307b.

In Step 1307b, information stored in the RAM memory 112 in Steps 1304b, 1305b, and 1306b is transferred and stored in the data storage area of the nonvolatile program memory 113C or the nonvolatile data memory 114C. With regard to the transferred and saved information, if the relevant abnormality is the same as the abnormality of the transferred and saved information in the past, the accumulated number of abnormality occurrence is stored.

Next, in the operation end step 1309, another control program is executed, and the process progresses to the operation start step 1301 again in a predetermined time.

(3) Main Points and Features of Third Embodiment

As understood from the above description, as a first main point, the current control device 100C for the electric load according to the third embodiment includes the power supply circuit part in which, the switching elements 121x and 121y, the current detection resistors 126x and 126y, and the electric loads 107x and 107y, to which power is supplied from the drive power supply 101, are connected in series to each other, and the control circuit part which controls the on/off ratios of the switching elements 121x and 121y on the basis of the target load current Is0 of the electric loads 107x and 107y and the load current Im flowing in the current detection resistors 126x and 126y. The control circuit part includes the microprocessor 111C having the nonvolatile program memory 113C, the RAM memory 112 for arithmetic processing, and the multichannel AD converter 115, the amplifier circuit parts 150x and 150y for current detection, the temperature detection circuits 170x and 170y, and the drive signal circuits 180x and 180y. The nonvolatile program memory 113C includes the temperature characteristic data 400 which is one of an approximation formula and a data table regarding temperature-to-resistance value of the current detection resistors 126*x* and 126*y*. The amplifier circuit parts 150*x* and 150*y* for current detection amplify the voltages across the current detection resistors 126*x* and 126*y* connected in series to the electric loads 107*x* and 107*y*, and generate the monitored voltages Efx and Efy which are based mainly on the current proportional components proportional to the load current Im for the electric loads 107*x* and 107*y* and include the error components. When the temperatures close to the current detection resistors 126*x* and 126*y* are the normal-temperature ambient temperature Ta, the control characteristic data which represents the correspondence relationship between the actually measured load current Im measured by the external ammeter 1001 for calibration and the target current Is0 is stored in one of the data storage area of the nonvolatile program memory 113C and the nonvolatile data memory 114C connected instead of the data storage area. The temperature detection circuits 170*x* and 170*y* include, the temperature sensors 171 and generate the measured voltages Sax and Say and the measured voltages Sbx and Sby corresponding to the normal-temperature ambient temperature Ta of the current detection resistors 126*x* and 126*y* and the actual operation ambient temperature Tb in operation, respectively, and the measured voltages Sa and Sb are input to the microprocessor 111C through the multichannel AD converter 115. The control circuit part generates the corrected signal voltage Es proportional to the corrected target current Is obtained by correcting the target load current Is0, and controls the on/off ratios of the switching elements 121*x* and 121*y* such that either one selected from a first relationship in which the corrected signal voltage Es coincides with the converted monitored voltage Efb of the monitored voltage Ef, and a second relationship in which the converted signal voltage Esb proportional to the converted target current Isb coincides with the monitored voltage Ef is satisfied. The corrected target current Is corresponds to the target load current Is0 generated by the control circuit part when the actually measured load current Im corresponding to the target load current Is0 is replaced by the target load current Is0 in the control characteristic data. One of the converted monitored voltage Efb and the converted target current Isb is calculated on the basis of the comparison value (Ra/Rb) or (Rb/Ra) between the normal-temperature resistance Ra and the actual operation resistance Rb of the current detection resistors 126*x* and 126*y* obtained from the temperature characteristic data in response to the normal-temperature ambient temperature Ta when the control characteristic data is obtained and the actual operation ambient temperature Tb in operation.

As described above, according to the first main point of the third embodiment, even when initial calibration is carried out only under the normal-temperature environment, since the control characteristic data 300 and the accurate temperature characteristic data 400 of the current detection resistors 126*x* and 126*y* are stored in advance, fluctuations of components and an accurate detected load current under the actual operation high-temperature environment or actual operation low-temperature environment can be estimated. With regard to changes in the resistance value due to self-heating of the current detection resistors 126*x* and 126*y* caused by the load current Im and the influence by the temperature differences between the temperatures of the current detection resistors 126*x* and 126*y* themselves and the ambient temperatures measured by the temperature detection circuits 170*x* and 170*y*, the converted monitored voltage Efb or the converted target current Isb is calculated on the basis of the comparison value (Ra/RID) or (Rb/Ra) between the normal-temperature resistance Ra obtained at the time of acquisition of the control characteristic data 400 and the actual operation resistance Rb obtained in the actual operation state, such that an accurate detected load current can be estimated and current control errors can be suppressed.

Accurate current control can be performed by using the current detection resistors 126*x* and 126*y* which do not require accuracy comparatively, without using the accurate current detection resistors 126*x* and 126*y* which have no change in a resistance value with respect to change in temperature. As a result, products become inexpensive.

In the current control device for the electric load according to the third embodiment, as a second main point, the nonvolatile program memory 113C includes the control program which constitutes the linear calibration section 210, the initial data storage section 208, the first conversion section 510, and the second conversion section 710A, 910, or 710B. The linear calibration section 210 receives the values of the first, second, and third load currents Im1, Im2, and Im3 obtained by measuring the load current Im actually flowing in the electric loads 107*x* and 107*y* and the current detection resistors 126*x* and 126*y* by the ammeter 1001 for calibration and generates the control characteristic data 300 when at least three predetermined target load currents Is01, Is02, and Is03 are set as the target load current Is0 such that the relationship Is01<Is02<Is03 between the first target load current Is01, the second target load current Is02 and the third target load current Is03 is established. The initial data storage section stores the target load current-to-corrected target current characteristic data 800 representing the relationship between the corrected target currents Is1, Is2, and Is3, which respectively control the first, second, and third load currents Im1, Im2, and Im3 to coincide with the target load currents Is01, Is02, and Is03, and the target load currents Is01, Is02, and Is03 in one of the data storage area of the nonvolatile program memory 113C and the nonvolatile data memory 114C. The initial data storage section stores either one selected from the value of the normal-temperature measured voltage Sa corresponding to the normal-temperature ambient temperature Ta detected by the temperature detection circuits 170*x* and 170*y* when the linear calibration section 210 is executed, and the value of the normal-temperature resistance Ra obtained from the temperature characteristic data of the current detection resistors 126*x* and 126*y* in response to the value of the normal-temperature ambient temperature Ta is stored in one the data storage area of the nonvolatile program memory 113C and the nonvolatile data memory 114C. The first conversion section 510 reads the measured voltages Sb in operation detected by the temperature detection circuits 170*x* and 170*y* to estimate the actual operation ambient temperature Tb, calculates the value of the actual operation resistance Rb obtained from the temperature characteristic data of the current detection resistors 126*x* and 126*y* at the actual operation ambient temperature Tb, and calculates one of the converted monitored voltage Efb=Efx(Ra/Rb) corresponding to the value of the monitored voltage Ef and the converted target current Isb=Is× (Rb/Ra) from the value of the corrected target current Is corresponding to the target load current IS0. The second conversion section 710A, 910, or 710B calculates the corrected target current Is corresponding to the target load current Is0 by a linear interpolation arithmetic operation on the basis of the target load current-to-corrected target current characteristic data 800 stored by the initial data storage section 208.

As described above, according to the second main point of the third embodiment, the control characteristic data 300 by the linear calibration section 210 is stored on the basis of three calibration currents having polygonal approximation characteristics, and the load current is controlled by the first conversion setting section 510 based on the temperature characteristics of the current detection resistors 126x and 126y and the second conversion setting section 710A, 900, or 710B based on the linear calibration section 210.

Therefore, nonlinear control characteristics due to the increase in the temperature rise of the current detection resistors 126x and 126y proportional to the square of the load current Im can be corrected.

In the current control device for the electric load according to the third embodiment, as a third main point, the linear calibration section 210 includes the first, second, and third linear calibration sections 210a, 210b, and 210c corresponding to the first, second, and third target load currents Is01, Is02, and Is03. The first, second, third linear calibration sections 210a, 210b, and 210c carry out a sequence of data acquisition processing on the basis of a predetermined time step in a short time, such that, even when the temperatures of the current detection resistors 126x and 126y rise, the influence on the ambient temperatures of the temperature detection circuits 170x and 170y is suppressed. The initial data storage section 208 calculates the average value of the measured voltages Sa1, Sa2, and Sa3 of the temperature detection circuits 170x and 170y measured by the first, second, and third linear calibration sections 210a, 210b, and 210c as the measured voltage Sa at the normal-temperature ambient temperature Ta, and the initial data storage section performs one of calculating the normal-temperature resistance Ra from the temperature characteristic data 400 and storing the average value of the normal-temperature resistances Ra1, Ra2, and Ra3 calculated from the temperature characteristic data 400 in response to the measured voltages Sa1, Sa2, and Sa3 as the normal-temperature resistance Ra.

As described above, according to the third main point of the third embodiment, three cycles of linear calibration by the three kinds of target load currents Is01, Is02, and Is03 are carried out in a short time, and the normal-temperature resistances Ra of the current detection resistors 126x and 126y is calculated and stored on the basis of the average value of the ambient temperatures measured by the respective cycles of linear calibration.

Therefore, the resistance values of the current detection resistors 126x and 126y under the normal-temperature environment can be accurately calculated without being influenced by measurement variations.

In the current control device for the electric load according to the third embodiment, as a fourth main point, the microprocessor 111C generates one of the corrected signal voltage Es proportional to the corrected target current Is and the converted signal voltage Esb proportional to the converted target current Isb. The microprocessor 111C generates the negative feedback control signal voltage having a proportional component and a deviation integral component with respect to the deviation voltage represented by one of $\Delta E =$ (Esb−Ef) corresponding to the monitored voltage Ef and $\Delta E =$ (Es−Efb) corresponding to the converted monitored voltage Efb, and generates the feedback control outputs PWMx and PWMy, which are pulse width modulation signals of the duty proportional to the negative feedback control signal voltage, to perform switching control of the switching elements 121x and 121y through the drive signal circuits 180x and 180y.

As described above, according to the fourth main point of the third embodiment, the microprocessor generates the feedback control outputs PWMx and PWMy, which are pulse width modulation signals of the duty proportional to the negative feedback control signal voltage, to perform switching control of the switching elements 121x and 121y.

Therefore, the drive signal circuits 180x and 180y which are hardware connected between the microprocessor 111C and the switching elements 121x and 121y can be made compact at low cost.

In the current control device for the electric load according to the third embodiment, as a fifth main point, the microprocessor 111C generates the converted signal voltage Esb proportional to the converted target current Isb, and generates the set control outputs PWMx and PWMy, which are pulse width modulation signals of the duty proportional to the converted signal voltage Esb, to perform switching control of the switching elements 121x and 121y through the drive signal circuits 180x and 180y. Each of the drive signal circuits 180x and 180y includes the target current setting circuit 130 which smoothes the set control output PWMx or PWMy to generate the target signal voltage Esc which coincides with the converted signal voltage Esb, and the comparison deviation integration circuit 140 which generates the negative feedback control signal voltage including the proportional component and the deviation integral component with respect to the deviation voltage $\Delta Eb =$ (Esc−Ef) between the target signal voltage Esc generated by the target current setting circuit 130 and the monitored voltage Ef, and performs switching control of the switching elements 121x and 121y in response to the negative feedback control signal voltage.

As described above, according to the fifth main point of the third embodiment, the microprocessor 111C generates the set control outputs PWMx and PWMy, which are pulse width modulation signals of the duty proportional to the converted signal voltage Esb, to perform switching control of the switching elements 121x and 121y through the target current setting circuit 130 and the deviation integration circuit 140.

Therefore, negative feedback control is performed by the drive signal circuits 180x and 180y which are hardware provided outside the microprocessor. As a result, the control burden imposed on the microprocessor 111C can be reduced.

In the current control device for the electric load according to the third embodiment, as a sixth main point, the power supply circuit part includes a plurality of switching elements 121x and 121y which supply power to a plurality of electric loads 107x and 107y, and a plurality of current detection resistors 126x and 126y. The microprocessor 111C is configured to perform switching control of the switching elements 121x and 121y through a plurality of drive signal circuits 180x and 180y, respectively. The microprocessor 111C supplies the control outputs PWMx and PWMy, which are pulse width modulation signals, to the plurality of drive signal circuits 180x and 180y. The control outputs PWMx and PWMy are pulse width modulation signals equivalent to one of the feedback control output PWMA and the set control output PWMB in accordance with whether negative feedback control is performed by one of the microprocessor 111C and the drive signal circuits 180x and 180y. The voltages across the plurality of current detection resistors 126x and 126y are input as the monitored voltages Efx and Efy to one of the microprocessor 111C and the drive signal circuits 180x and 180y through the amplifier circuit parts 150x and 150y, and the ambient temperatures of the plurality of current detection resistors 126x and 126y are measured by the temperature detection circuits 170x and 170y and input to the microprocessor 111C.

As described above, according to the sixth main point of the third embodiment, the microprocessor 111C is configured to perform current control of a plurality of electric loads 107x and 107y, and a plurality of temperature detection circuits 170x and 170y are provided to correspond to a plurality of switching elements 121x and 121y and a plurality of current detection resistors 126x and 126y.

Therefore, even when the load current differs between the switching elements 121x and 121y, the ambient temperatures close to the current detection resistors 126x and 126y are accurately measured, such that current control can be performed accurately with respect to the environmental temperature and load changes.

In the current control device for the electric load according to the third embodiment, as a seventh main point, the program memory 113O includes the control program which constitutes the temperature rise measurement section 207b. The temperature rise measurement section 207b continuously supplies a predetermined load current Im to the current detection resistors 126x and 126y when the linear calibration section 210 has been executed, reads the measured voltages Sm of the temperature detection circuits 170x and 170y when a predetermined time has elapsed, and measures the temperature rise values ΔS=Sm−Sa, which are the differences between the measured voltages Sm and the measured voltages Sa at the normal-temperature ambient temperature Ta, and the value of the continuously supplied load current Im as temperature rise data. The initial data storage section 208 writes and stores the temperature rise data in one of the data storage area of the nonvolatile program memory 113C and the nonvolatile data memory 114C.

As described above, according to the seventh main point of the third embodiment, the temperature rise values in the vicinity of the temperature detection circuits 170x and 170y corresponding to the load current Im are measured and stored by the differences between the measured voltages Sa of the temperature detection circuits 170x and 170y before the load current Im is continuously supplied and the measured voltages Sm after the load current Im is continuously supplied.

Therefore, in the actual operation state, the temperature rise values of the regions where the temperature detection circuits 170x and 170y are provided based on the load current Im are estimated, and the environmental temperature inside the current control device 100 is estimated by the temperature detection circuits 170x and 170y. If the estimated environmental temperature is excessive, the abnormality warning can be output or abnormality processing, such as the suppression operation of the load, can be carried out.

In the current control device for the electric load according to the third embodiment, as an eighth main point, the program memory 113C which collaborates with the microprocessor 111C includes the control program which constitutes the discrete abnormality, determination section 1304a regarding the ambient temperatures of the current detection resistors 126x and 126y. When the ambient temperatures detected by the first and second temperature detection circuits 170x and 170y are out of a predetermined permissible range value, the discrete abnormality determination section 1304a determines that a discrete abnormality occurs. The predetermined permissible range value is the upper and lower limit values of the actual operation temperature obtained by adding the maximum temperature rise values of the first and second current detection resistors 126x and 126y to the upper limit values of the upper and lower limit values of the environmental temperature to be applied. The discrete abnormality determination section 1304a carries out abnormality determination when one of the ambient temperatures detected by the first and second temperature detection circuits 170x and 170y is excessively larger than the other ambient temperature, and the difference between the ambient temperatures exceeds the maximum temperature rise values of the first and second current detection resistors 126x and 126y, and when the discrete abnormality determination section 1304a carries out abnormality determination, either one selected from a first abnormal action in which the abnormality warning is output and a second abnormal action in which at least abnormality occurrence history information is stored in terms of the causes of abnormality occurrence is performed, and written and stored in one of the data storage area of the nonvolatile program memory 113C and the nonvolatile data memory 114C.

As described above, according to the eighth main point of the third embodiment, abnormality determination of the ambient temperatures of the current detection resistors 126x and 126y is carried out by a plurality of temperature detection circuits 170x and 170y which are arranged close to a plurality of current detection resistors 126x and 126y, and then the abnormality warning is output or the abnormality occurrence history is stored.

Therefore, when an abnormality occurs, the abnormality warning is output or the abnormality occurrence history is stored, such that the workability of maintenance can be improved.

In the current control device for the electric load according to the third embodiment, as a ninth main point, the program memory 113C which collaborates the microprocessor 111C includes the control program which constitutes the first and second environmental temperature estimation sections 1303a and 1303b, with one of the sensor abnormality determination section 1305a and the temperature abnormality determination section 1306a. The first environmental temperature estimation section 1303a estimates the first environmental temperature by subtracting the temperature rise amount by the first current detection resistor 126x from among the plurality of current detection resistors from the ambient temperature detected by the first temperature detection circuit 170x from among the plurality of temperature detection circuits in reference to the moving average value with respect to the square value of the load current Imx of the first electric load 107x from among the plurality of electric loads and the temperature rise data by the temperature rise measurement section 207b. The second environmental temperature estimation section 1303b estimates the second environmental temperature by subtracting the temperature rise amount by the second current detection resistor 126y from among the plurality of current detection resistors from the ambient temperature detected by the second temperature detection circuit 170y from among the plurality of temperature detection circuits in reference to the moving average value with respect to the square value of the load current Imy of the second electric load 107y from among the plurality of electric loads and the temperature rise data by the temperature rise measurement section 207b. When one of the first and second environmental temperatures estimated by the first and second environmental temperature estimation sections 1303a and 1303b is excessively larger than the other environmental temperature, the sensor abnormality determination section 1305a determines that at least one of the plurality of temperature detection circuits 170x and 170y is abnormal, and when the sensor abnormality determination section 1305a does not carry out abnormality determination, if the first and second environmental temperatures estimated by the first and second environmental temperature estimation sections 1303a and 1303b are both excessive, the temperature abnormality determination section 1306a determines that the environmental temperature is excessive, and when one of the sensor abnormality determination section 1305a and the temperature abnormality determination section 1306a carries out abnormality determination, either one selected from the first abnormal action in which the abnormality warning is output and a second abnormal action in which abnormality occurrence history information is stored in terms of the causes of abnormality occurrence is performed, and written and stored in the data storage area of the nonvolatile program memory 113C or the nonvolatile data memory 114C.

As described above, according to the ninth main point of the third embodiment, the first and second environmental temperatures excluding the influence of the temperature rise of the current detection resistors 126x and 126y are estimated by a plurality of temperature detection circuits 170x and 170y which are arranged close to a plurality of current detection resistors 126x and 126y, such that the abnormality of the temperature detection circuits 170x and 170y or the abnormality of the environmental temperature is determined.

Therefore, abnormal current control due to the abnormality of the temperature detection circuits 170x and 170y is avoided, when the environmental temperature is excessive, the control mode for overload suppression is carried out, or the abnormality warning is output or the abnormality history is stored. As a result, the workability of maintenance can be improved.

Various modifications and alterations of the invention will be apparent to those skilled in the art without departing from the scope and spirit of the invention, and it should be understood that this is not limited to the illustrative embodiments set forth herein.

What is claimed is:

1. A current control device for an electric load comprising:
   a power supply circuit part in which a switching element, a current detection resistor, and the electric load, to which power is supplied from a drive power supply, are connected in series to each other; and
   a control circuit part which controls an on/off ratio of the switching element on the basis of a target load current Is0 for the electric load and a load current Im flowing in the current detection resistor,
   wherein the control circuit part includes a microprocessor having a nonvolatile program memory, an RAM memory for arithmetic processing, and a multichannel AD converter, an amplifier circuit part for current detection, a temperature detection circuit, and a drive signal circuit,
   the nonvolatile program memory includes temperature characteristic data which is one of an approximation formula and a data table regarding temperature-to-resistance value of the current detection resistor,
   the amplifier circuit part for current detection amplifies a voltage across the current detection resistor, and generates a monitored voltage Ef which is based mainly on a current proportional component proportional to the load current Im for the electric load and includes an error component,
   when the temperature close to the current detection resistor is a normal-temperature ambient temperature Ta, control characteristic data which represents the correspondence relationship between an actually measured load current Im measured by an external ammeter for calibration and the target load current Is0 is stored in one of a data storage area of the nonvolatile program memory and a nonvolatile data memory connected instead of the data storage area,
   the temperature detection circuit includes a temperature sensor and generates measured voltages Sa and Sb corresponding to the normal-temperature ambient temperature Ta of the current detection resistor and an actual operation ambient temperature Tb in operation, respectively, and the measured voltages Sa and Sb are input to the microprocessor through the multichannel AD converter,
   the control circuit part generates a corrected signal voltage Es proportional to a corrected target current Is obtained by correcting the target load current Is0, and controls the on/off ratio of the switching element such that either one selected from a first relationship in which the corrected signal voltage Es coincides with a converted monitored voltage Efb of the monitored voltage Ef, and a second relationship in which a converted signal voltage Esb proportional to a converted target current Isb coincides with the monitored voltage Ef is satisfied,
   the corrected target current Is corresponds to the target load current Is0 generated by the control circuit part when the actually measured load current Im corresponding to the target load current Is0 is replaced by the target load current Is0 in the control characteristic data, and
   one of the converted monitored voltage Efb and the converted target current Isb is calculated on the basis of a comparison value of normal-temperature resistance Ra and actual operation resistance Rb of the current detection resistor obtained from the temperature characteristic data in response to the normal-temperature ambient temperature Ta when the control characteristic data is obtained and the actual operation ambient temperature Tb in operation.

2. The current control device for the electric load according to claim 1,
   wherein the temperature detection circuit and the current detection resistor are surface mounted components with either one selected from a first arrangement in which the temperature detection circuit and the current detection resistor are arranged to be adjacent to each other on the same electronic substrate and a second arrangement in which the temperature detection circuit and the current detection resistor are arranged to be close to each other so as to form a single integrated surface mounted part mounted on the electronic substrate,
   the temperature detection circuit is arranged to be closest to the current detection resistor so as to be most easily influenced by a rise in temperature due to heat generation of the current detection resistor, in addition to outside air temperature and environmental temperature with an indirect temperature rise due to heat generating components including the switching element and a control power supply unit,
   the resistance value R of the current detection resistor has a reference resistance value R00 corresponding to predetermined reference temperature Ta00, and
   the temperature characteristic data is stored in the program memory as one of an approximation formula and a data table of a standard characteristic which is approximated by at least two polygonal characteristics corresponding to an ambient temperature region higher than the reference temperature Ta00 and an ambient temperature lower than the reference temperature Ta00.

3. The current control device for the electric load according to claim 1,
   wherein the nonvolatile program memory further includes a control program which constitutes a linear calibration section, an initial data storage section, a first conversion section, and a second conversion section,
   the linear calibration section receives the values of first, second, and third load current Im1, Im2, and Im3 obtained by measuring the load current Im flowing in the electric load and the current detection resistor by the ammeter for calibration and generates the control characteristic data when at least three target load currents Is01, Is02, and Is03 are set as the target load current Is0 such that the relationship Is01<Is02<Is03 between the first target load current Is01, the second target load current Is02 and the third target load current Is03 is established, the initial data storage section stores target load current-to-corrected target current characteristic data representing the relationship between corrected target currents Is1, Is2, and Is3, which respectively control the first, second, and third load currents Im1, Im2, and Im3 to coincide with the target load currents Is01, Is02, Is03, and the target load currents Is01, Is02, and Is03 in one of the data storage area of the nonvolatile program memory and the nonvolatile data memory, and stores either one selected from the value of a normal-temperature measured voltage Sa corresponding to the normal-temperature ambient temperature Ta detected by the temperature detection circuit when the linear calibration section is executed and the value of the normal-temperature resistance Ra obtained from the temperature characteristic data of the current detection resistor in response to the value of the normal-temperature ambient temperature Ta in one of the data storage area of the nonvolatile program memory and the nonvolatile data memory, the first conversion section reads the measured voltage Sb in operation detected by the temperature detection circuit to estimate the actual operation ambient temperature Tb, calculates the value of actual operation resistance Rb obtained from the temperature characteristic data of the current detection resistor at the actual operation ambient temperature Tb, and calculates one of a converted monitored voltage $Efb=Ef \times (Ra/Rb)$ corresponding to the value of the monitored voltage Ef and the converted target current $Isb=Is \times (Rb/Ra)$ from the value of the corrected target current Is corresponding to the target load current Is0, and the second conversion section calculates a corrected target current Is corresponding to the target load current Is0 by a linear interpolation arithmetic operation on the basis of the target load current-to-corrected target current characteristic data stored by the initial data storage section.

4. The current control device for the electric load according to claim 3, wherein the linear calibration section includes first, second, and third linear calibration sections corresponding to the first, second, and third target load currents Is01, Is02, and Is03, the first, second, and third linear calibration sections carry out a sequence of data acquisition processing on the basis of a predetermined time step in a short time, such that, even when the temperature of the current detection resistor rises, an influence on the ambient temperature of the temperature detection circuit is suppressed, the initial data storage section calculates the average value of measured voltages Sa1, Sa2, and Sa3 of the temperature detection circuit measured by the first, second, and third linear calibration sections as the measured voltage Sa at the normal-temperature ambient temperature Ta, and the initial data storage section performs one of calculating the normal-temperature resistance Ra from the temperature characteristic data and storing the average value of normal-temperature resistances Ra1, Ra2, and Ra3 calculated from the temperature characteristic data in response to the measured voltages Sa1, Sa2, and Sa3 as the normal-temperature resistance Ra.

5. The current control device for the electric load according to claim 4, wherein the nonvolatile program memory further includes a control program which constitutes a temperature sensor calibration section, and the temperature sensor calibration section reads the value of a calibration initial measured voltage Sa0, which is a measured voltage by the temperature detection circuit, and the value of a calibration initial temperature Ta0 measured by an external thermometer for calibration prior to executing the linear calibration section, and the read data is written and stored in one of the data storage area of the nonvolatile program memory and the nonvolatile data memory.

6. The current control device for the electric load according to claim 3, wherein the nonvolatile program memory further includes a control program which constitutes an offset error measurement section, a drive power supply voltage Vb supplied from the drive power supply is input to the microprocessor as a power supply monitoring voltage Vf through a voltage dividing resistor and the multichannel AD converter, the offset error measurement section measures the correspondence relationship between the error component from among the current proportional component and the error component of the monitored voltage Ef and the power supply monitoring voltage Vf before the linear calibration section is executed, the measured data is written and stored in one of the data storage area of the nonvolatile program memory and the nonvolatile data memory as offset data, and in a current control operation, one of the value of the monitored voltage Ef and the value of the corrected target current Is0 is added or subtracted so as to correct the error component in accordance with the present value of the power supply monitoring voltage Vf.

7. The current control device for the electric load according to claim 3, wherein the microprocessor generates one of the corrected signal voltage Es proportional to the corrected target current Is and the converted signal voltage Esb proportional to the converted target current Isb, and the microprocessor generates a negative feedback control signal voltage having a proportional component and a deviation integral component with respect to a deviation voltage represented by one of $\Delta E=(Esb-Ef)$ corresponding to the monitored voltage Ef and $\Delta E=(Es-Efb)$ corresponding to the converted monitored voltage Efb, and generates a feedback control output PWMA, which is a pulse width modulation signal of a duty proportional to the negative feedback control signal voltage, to perform switching control of the switching element through the drive signal circuit.

8. The current control device for the electric load according to claim 3, wherein the microprocessor generates the converted signal voltage Esb proportional to the converted target current Isb and generates a set control output PWMB, which is a pulse width modulation signal of a duty proportional to the converted signal voltage Esb, to perform switching control of the switching element through the drive signal circuit, and the drive signal circuit includes a target current setting circuit which smoothes the set control output PWMB to generate a target signal voltage Esc, which coincides with the converted signal voltage Esb, and a comparison deviation integration circuit which generates a negative feedback control signal voltage having a proportional component and a deviation integral component with respect to a deviation voltage $\Delta Eb=(Esc-Ef)$ between the target signal voltage Esc generated by the target current setting circuit and the monitored voltage Ef, and performs switching control of the switching element in accordance with the negative feedback control signal voltage.

9. The current control device for the electric load according to claim 7,
wherein the power supply circuit part includes a plurality, of switching elements which supply power to a plurality of electric loads, and a plurality of current detection resistors,
the microprocessor is configured to perform switching control of the switching elements through a plurality of drive signal circuits, respectively,
the microprocessor supplies control outputs PWMx and PWMy, which are pulse width modulation signals, to the plurality of drive signal circuits,
the control outputs PWMx and PWMy are pulse width modulation signals equivalent to one of the feedback control output PWMA and the set control output PWMB in accordance with whether negative feedback control is performed by one of the microprocessor and the drive signal circuits, and
the voltages across the plurality of current detection resistors are input as monitored voltages Efx and Efy to one of the microprocessor and the drive signal circuits through the amplifier circuit parts, and the ambient temperatures of the plurality of current detection resistors are measured by the temperature detection circuits and input to the microprocessor.

10. The current control device for the electric load according to claim 8,
wherein the power supply circuit part includes a plurality of switching elements which supply power to a plurality of electric loads, and a plurality of current detection resistors,
the microprocessor is configured to perform switching control of the switching elements through a plurality of drive signal circuits, respectively,
the microprocessor supplies control outputs PWMx and PWMy, which are pulse width modulation signals, to the plurality of drive signal circuits,
the control outputs PWMx and PWMy are pulse width modulation signals equivalent to one of the feedback control output PWMA and the set control output PWMB in accordance with whether negative feedback control is performed by one of the microprocessor and the drive signal circuits, and
the voltages across the plurality of current detection resistors are input as monitored voltages Efx and Efy to one of the microprocessor and the drive signal circuits through the amplifier circuit parts, and the ambient temperatures of the plurality of current detection resistors are measured by the temperature detection circuits and input to the microprocessor.

11. The current control device for the electric load according to claim 4,
wherein the program memory includes a control program which constitutes a temperature rise measurement section,
the temperature rise measurement section continuously supplies a predetermined load current Im to the current detection resistor when the linear calibration section has been executed, reads a measured voltage Sm of the temperature detection circuit when a predetermined time has elapsed, and measures a temperature rise value $\Delta S=Sm-Sa$, which is a difference between the measured voltage Sm and the measured voltage Sa at the normal-temperature ambient temperature Ta, and the value of the continuously supplied load current Im as temperature rise data, and
the initial data storage section writes and stores the temperature rise data in one of the data storage area of the nonvolatile program memory and the nonvolatile data memory.

12. The current control device for the electric load according to claim 9,
wherein the program memory includes a control program which constitutes a temperature rise measurement section,
the temperature rise measurement section continuously supplies a predetermined load current Im to the current detection resistor when the linear calibration section has been executed, reads a measured voltage Sm of the temperature detection circuit when a predetermined time has elapsed, and measures a temperature rise value $\Delta S=Sm-Sa$, which is a difference between the measured voltage Sm and the measured voltage Sa at the normal-temperature ambient temperature Ta, and the value of the continuously supplied load current Im as temperature rise data, and
the initial data storage section writes and stores the temperature rise data in one of the data storage area of the nonvolatile program memory and the nonvolatile data memory.

13. The current control device for the electric load according to claim 10,
wherein the program memory includes a control program which constitutes a temperature rise measurement section,
the temperature rise measurement section continuously supplies a predetermined load current Im to the current detection resistor when the linear calibration section has been executed, reads a measured voltage Sm of the temperature detection circuit when a predetermined time has elapsed, and measures a temperature rise value $\Delta S=Sm-Sa$, which is a difference between the measured voltage Sm and the measured voltage Sa at the normal-temperature ambient temperature Ta, and the value of the continuously supplied load current Im as temperature rise data, and
the initial data storage section writes and stores the temperature rise data in one of the data storage area of the nonvolatile program memory and the nonvolatile data memory.

14. The current control device for the electric load according to claim 11,
wherein the program memory which collaborates with the microprocessor includes a control program which constitutes a discrete abnormality determination section regarding the ambient temperatures of the current detection resistors,
the control circuit part includes first and second temperature detection circuits,
when the ambient temperatures detected by the first and second temperature detection circuits are out of a predetermined permissible range value, the discrete abnormality determination section determines that a discrete abnormality occurs, the predetermined permissible range value is the upper and lower limit values of actual operation temperature obtained by adding the maximum temperature rise values of the first and second current detection resistors to upper limit values of the upper and lower limit values of environmental temperature to be applied, the discrete abnormality determination section carries out abnormality determination when one of the ambient temperatures detected by the first and second temperature detection circuits is excessively larger than the other ambient temperature, and the difference between the ambient temperatures exceeds the maximum temperature rise values of the first and second current detection resistors, and when the discrete abnormality determination section carries out abnormality determination, either one selected from a first abnormal action in which the abnormality warning is output and a second abnormal action in which at least abnormality occurrence history information is stored in terms of the causes of abnormality occurrence is performed, and written and stored in one of the data storage area of the nonvolatile program memory and the nonvolatile data memory.

15. The current control device for the electric load according to claim 12, wherein the program memory which collaborates with the microprocessor includes a control program which constitutes a discrete abnormality determination section regarding the ambient temperatures of the current detection resistors, the control circuit part includes first and second temperature detection circuits, when the ambient temperatures detected by the first and second temperature detection circuits are out of a predetermined permissible range value, the discrete abnormality determination section determines that a discrete abnormality occurs, the predetermined permissible range value is the upper and lower limit values of actual operation temperature obtained by adding the maximum temperature rise values of the first and second current detection resistors to upper limit values of the upper and lower limit values of environmental temperature to be applied, the discrete abnormality determination section carries out abnormality determination when one of the ambient temperatures detected by the first and second temperature detection circuits is excessively larger than the other ambient temperature, and the difference between the ambient temperatures exceeds the maximum temperature rise values of the first and second current detection resistors, and when the discrete abnormality determination section carries out abnormality determination, either one selected from a first abnormal action in which the abnormality warning is output and a second abnormal action in which at least abnormality occurrence history information is stored in terms of the causes of abnormality occurrence is performed, and written and stored in one of the data storage area of the nonvolatile program memory and the nonvolatile data memory.

16. The current control device for the electric load according to claim 13, wherein the program memory which collaborates with the microprocessor includes a control program which constitutes a discrete abnormality determination section regarding the ambient temperatures of the current detection resistors, the control circuit part includes first and second temperature detection circuits, when the ambient temperatures detected by the first and second temperature detection circuits are out of a predetermined permissible range value, the discrete abnormality determination section determines that a discrete abnormality occurs, the predetermined permissible range value is the upper and lower limit values of actual operation temperature obtained by adding the maximum temperature rise values of the first and second current detection resistors to upper limit values of the upper and lower limit values of environmental temperature to be applied, the discrete abnormality determination section carries out abnormality determination when one of the ambient temperatures detected by the first and second temperature detection circuits is excessively larger than the other ambient temperature, and the difference between the ambient temperatures exceeds the maximum temperature rise values of the first and second current detection resistors, and when the discrete abnormality determination section carries out abnormality determination, either one selected from a first abnormal action in which the abnormality warning is output and a second abnormal action in which at least abnormality occurrence history information is stored in terms of the causes of abnormality occurrence is performed, and written and stored in one of the data storage area of the nonvolatile program memory and the nonvolatile data memory.

17. The current control device for the electric load according to claim 14, wherein the program memory which collaborates with the microprocessor includes a control program which constitutes first and second environmental temperature estimation sections with one of a sensor abnormality determination section and a temperature abnormality determination section, the first environmental temperature estimation section estimates a first environmental temperature by subtracting a temperature rise amount by a first current detection resistor from among the plurality of current detection resistors from the ambient temperature detected by the first temperature detection circuit from among the plurality of temperature detection circuits in reference to a moving average value with respect to a square value of a load current Imx of a first electric load from among the plurality of electric loads and temperature rise data by the temperature rise measurement section, the second environmental temperature estimation section estimates a second environmental temperature by subtracting a temperature rise amount by a second current detection resistor from among the plurality of current detection resistors from the ambient temperature detected by the second temperature detection circuit from among the plurality of temperature detection circuits in reference to a moving average value with respect to a square value of a load current Imy of a second electric load from among the plurality of electric loads and temperature rise data by the temperature rise measurement section, and when one of the first and second environmental temperatures estimated by the first and second environmental temperature estimation sections is excessively larger than the other environmental temperature, the sensor abnormality determination section determines that at least one of the plurality of temperature detection circuits is abnormal, when the sensor abnormality determination section does not carry out abnormality determination, if the first and second environmental temperatures estimated by the first and second environmental temperature estimation sections are both excessive, the temperature abnormality determination section determines that the environmental temperature is excessive, and when one of the sensor abnormality determination section and the temperature abnormality determination section carries out abnormality determination, either one selected from the first abnormal action in which the abnormality warning is output and the second abnormal action in which abnormality occurrence history information is stored in terms of the causes of abnormality occurrence is performed, and written and stored in one of the data storage area of the nonvolatile program memory and the nonvolatile data memory.

18. The current control device for the electric load according to claim 15, wherein the program memory which collaborates with the microprocessor includes a control program which constitutes first and second environmental temperature estimation sections with one of a sensor abnormality determination section and a temperature abnormality determination section, the first environmental temperature estimation section estimates a first environmental temperature by subtracting a temperature rise amount by a first current detection resistor from among the plurality of current detection resistors from the ambient temperature detected by the first temperature detection circuit from among the plurality of temperature detection circuits in reference to a moving average value with respect to a square value of a load current Imx of a first electric load from among the plurality of electric loads and temperature rise data by the temperature rise measurement section, the second environmental temperature estimation section estimates a second environmental temperature by subtracting a temperature rise amount by a second current detection resistor from among the plurality of current detection resistors from the ambient temperature detected by the second temperature detection circuit from among the plurality of temperature detection circuits in reference to a moving average value with respect to a square value of a load current Imy of a second electric load from among the plurality of electric loads and temperature rise data by the temperature rise measurement section, and when one of the first and second environmental temperatures estimated by the first and second environmental temperature estimation sections is excessively larger than the other environmental temperature, the sensor abnormality determination section determines that at least one of the plurality of temperature detection circuits is abnormal, when the sensor abnormality determination section does not carry out abnormality determination, if the first and second environmental temperatures estimated by the first and second environmental temperature estimation sections are both excessive, the temperature abnormality determination section determines that the environmental temperature is excessive, and when one of the sensor abnormality determination section and the temperature abnormality determination section carries out abnormality determination, either one selected from the first abnormal action in which the abnormality warning is output and the second abnormal action in which abnormality occurrence history information is stored in terms of the causes of abnormality occurrence is performed, and written and stored in one of the data storage area of the nonvolatile program memory and the nonvolatile data memory.

19. The current control device for the electric load according to claim 16, wherein the program memory which collaborates with the microprocessor includes a control program which constitutes first and second environmental temperature estimation sections with one of a sensor abnormality determination section and a temperature abnormality determination section, the first environmental temperature estimation section estimates a first environmental temperature by subtracting a temperature rise amount by a first current detection resistor from among the plurality of current detection resistors from the ambient temperature detected by the first temperature detection circuit from among the plurality of temperature detection circuits in reference to a moving average value with respect to a square value of a load current Imx of a first electric load from among the plurality of electric loads and temperature rise data by the temperature rise measurement section, the second environmental temperature estimation section estimates a second environmental temperature by subtracting a temperature rise amount by a second current detection resistor from among the plurality of current detection resistors from the ambient temperature detected by the second temperature detection circuit from among the plurality of temperature detection circuits in reference to a moving average value with respect to a square value of a load current Imy of a second electric load from among the plurality of electric loads and temperature rise data by the temperature rise measurement section, and when one of the first and second environmental temperatures estimated by the first and second environmental temperature estimation sections is excessively larger than the other environmental temperature, the sensor abnormality determination section determines that at least one of the plurality of temperature detection circuits is abnormal, when the sensor abnormality determination section does not carry out abnormality determination, if the first and second environmental temperatures estimated by the first and second environmental temperature estimation sections are both excessive, the temperature abnormality determination section determines that the environmental temperature is excessive, and when one of the sensor abnormality determination section and the temperature abnormality determination section carries out abnormality determination, either one selected from the first abnormal action in which the abnormality warning is output and the second abnormal action in which abnormality occurrence history information is stored in terms of the causes of abnormality occurrence is performed, and written and stored in one of the data storage area of the nonvolatile program memory and the nonvolatile data memory.

* * * * *